US005912783A

United States Patent [19]
Ishida et al.

[11] Patent Number: 5,912,783
[45] Date of Patent: Jun. 15, 1999

[54] MAGNETIC RECORDING AND REPRODUCING APPARATUS HAVING RING-TYPE MAGNETIC HEAD WITH METALLIC SOFT MAGNETIC FILMS OF DIFFERING THICKNESSES

[75] Inventors: Tatsuaki Ishida, Sakai; Ryuji Sugita, Hirakata; Noriyasu Echigo, Ashiya; Hiroyuki Hasegawa, Tsuzuki-Gun, all of Japan

[73] Assignee: Matsushita Electric Industrial Co., Ltd., Osaka, Japan

[21] Appl. No.: 08/762,958

[22] Filed: Dec. 10, 1996

Related U.S. Application Data

[62] Division of application No. 08/413,945, Mar. 30, 1995, abandoned.

[30] Foreign Application Priority Data

Mar. 31, 1994 [JP] Japan ................................... 6-62680
Aug. 30, 1994 [JP] Japan ................................... 6-205132

[51] Int. Cl.$^6$ .......................... G11B 5/008; G11B 5/012; G11B 5/23; G11B 5/31
[52] U.S. Cl. .......................... 360/88; 360/93; 360/97.01; 360/119; 360/126
[58] Field of Search ........................... 360/125, 120, 360/126, 119, 88, 93, 97.01

[56] References Cited

U.S. PATENT DOCUMENTS

| | | | |
|---|---|---|---|
| 3,143,603 | 8/1964 | Widener | 360/120 |
| 4,646,184 | 2/1987 | Goto et al. | 360/120 |
| 4,670,807 | 6/1987 | Gorter et al. | |
| 4,890,378 | 1/1990 | Suzuki et al. | 360/119 |
| 4,926,276 | 5/1990 | Orikasa et al. | 360/125 |
| 5,108,837 | 4/1992 | Mallary | 360/126 |
| 5,140,486 | 8/1992 | Yokoyama et al. | 360/125 |
| 5,247,415 | 9/1993 | Kumasaka et al. | 360/126 |
| 5,270,894 | 12/1993 | Okuda et al. | 360/120 |
| 5,396,391 | 3/1995 | Tanaka et al. | 360/125 |

FOREIGN PATENT DOCUMENTS

| | | |
|---|---|---|
| 0490669 | 6/1992 | European Pat. Off. |
| 4021438 | 1/1991 | Germany |
| 58-143401 | 8/1983 | Japan |
| 2-015418 | 1/1990 | Japan |
| 4-048402 | 2/1992 | Japan |
| 4-351701 | 12/1992 | Japan |
| 89/05505 | 6/1989 | WIPO |

OTHER PUBLICATIONS

Patent Abstracts of Japan, vol. 017, No. 215 (P–1527), Apr. 27, 1993, family member of JP–A–04 351701.
Patent Abstracts of Japan, vol. 011, No. 319 (P–627), Oct. 17, 1987, family member of JP–A–62 107409.
Patent Abstracts of Japan, vol. 011, No. 264 (P–610), Aug. 27, 1987, family member of JP–A–62 067710.
Patent Abstracts of Japan, vol. 004, No. 160 (P–035), Nov. 8, 1980, family member of JP–A–55 108920.
Patent Abstracts of Japan, vol. 015, No. 266 (P–1223), Jul. 5, 1991, family member of JP–A–03 086914.

*Primary Examiner*—Craig A. Renner
*Attorney, Agent, or Firm*—Greenblum & Bernstein P.L.C.

[57] ABSTRACT

In a magnetic recording and reproduction apparatus wherein signals are recorded with a ring-type magnetic head to a magnetic recording medium having axis of easy magnetization oblique with respect to a film normal of a magnetic layer of the medium A recording magnetic field generated by the magnetic head is asymmetric with respect to a center line of a gap of the magnetic circuit, and the recording magnetic field in the magnetic layer around a leading edge of the magnetic head is inclined at the same side as the axis of easy magnetization in the magnetic field in a normal plane of the magnetic layer including a direction of relative movement of the magnetic head to the magnetic recording medium when signals are recorded to the medium. Thus, signals can be recorded at a high density. Various types of magnetic head for generating asymmetric magnetic field are provided.

12 Claims, 18 Drawing Sheets

MAGNETIC RECORDING AND REPRODUCING APPARATUS HAVING RING-TYPE MAGNETIC HEAD WITH METALLIC SOFT MAGNETIC FILMS OF DIFFERING THICKNESSES

This application is a division of application Ser. No. 08/413,945, filed Mar. 30, 1995, now abandoned.

BACKGROUND OF THE INVENTION

1. Field of the Invention

The present invention relates to a magnetic recording and reproduction apparatus such as a video cassette recorder having excellent high density recording and reproduction characteristics and to a magnetic head mounted to the apparatus.

2. Description of Background Information the Prior Art

Recently, a magnetic recording and reproduction apparatus such as a video cassette recorder or a hard disk drive tends to record and reproduce signals at a higher density to and from a magnetic recording medium so as to provide a compact apparatus having a large storage capacity. Then, in a field of magnetic recording medium and magnetic head, many workers perform research and development to improve recording and reproduction characteristics in a high record density region.

In order to improve a resolution for recording and reproduction in a high recording density region to and from a magnetic recording medium, it is required to increase remnant magnetization of a magnetic layer of the medium accompanied by the increase in coercive force and the decrease in thickness of the magnetic layer in correspondence to the increase in remnant magnetization. Especially, thin film magnetic recording media prepared with vacuum evaporation, sputtering, ion plating or the like have attracted attention owing to their performance exceeding a limit of prior art coat-type magnetic recording medium.

As to the magnetic head, a soft magnetic material having a higher saturation magnetic flux density is developed in order to improve recording performance in correspondence to a higher coercive force of magnetic recording medium. A ring-type magnetic head having a soft magnetic material with saturation magnetic flux density exceeding 1.5 T is already used practically.

An evaporation tape used for a Hi-8 video cassette recorder is a representative of thin film magnetic recording media. A characteristic of the magnetic recording media is that axis of easy magnetization is oblique relative to a film normal of a magnetic layer thereof in contrast to prior art longitudinal recording media. That is, the axis of easy magnetization is not in a film plane or along a film normal of the magnetic layer, but along a direction oblique relative to the film normal. For example, in a deposition tape for a Hi-8 video cassette recorder, the axis of easy magnetization is oblique by about 70° relative to the film normal in a normal plane including a longitudinal direction of the tape. Magnetization recorded by a ring-type magnetic head remains along the axis of easy magnetization, and provides a magnetization mode different from that of prior art longitudinal recording. Such oblique magnetization mode improves characteristics at high recording densities relative to prior art longitudinal recording media. As the superiority of the oblique magnetization mode relative to the longitudinal magnetization mode becomes clear, it is also attempted to improve characteristics at high recording densities by realizing oblique magnetization mode for prior art coat-type media.

A magnetic recording and reproduction apparatus tends to be developed to record signals at a higher density for providing a more compact apparatus having a larger storage capacity. Then, in a magnetic recording and reproduction system with a combination of a magnetic head and a magnetic recording medium, it is required more and more to provide a higher S/N ratio, especially in a region of higher linear recording densities.

SUMMARY OF THE INVENTION

An object of the present invention is to provide a magnetic recording and reproduction apparatus suitable for recording for an obliquely oriented magnetic recording medium.

An object of the present invention is to provide a magnetic head suitable for a magnetic recording and reproduction apparatus for recording to an obliquely oriented magnetic recording medium.

The invention improves magnetic recording and reproduction performance to solve the above-mentioned problems by paying attention to a recording mechanism of a ring-type magnetic head of a recording and reproduction apparatus for a magnetic recording medium having axis of easy magnetization oblique with respect to a film normal of a magnetic layer of the magnetic recording medium. In a recording and reproduction apparatus of the invention including the magnetic head and the magnetic recording medium, recording magnetic field in the magnetic recording medium is asymmetric with respect to a center line of a gap of the magnetic head. Further, a direction of a recording magnetic field around the leading edge as well as axis of easy magnetization of the magnetic recording medium are oblique in the magnetic layer at the same side with respect to the film normal of the magnetic layer in a normal plane of the magnetic layer including a direction of relative movement of the ring-type magnetic head to the magnetic recording medium when signals are recorded to the magnetic recording medium.

A magnetic head according to the invention generates an asymmetric magnetic field, for example, by using a soft magnetic film or films used at a trailing edge of the magnetic head having saturation magnetic flux density larger than that of a soft magnetic film or films used at a leading edge of the ring-type magnetic head. It is also possible to generate the asymmetric magnetic field by setting a thickness of a soft magnetic film larger at the trailing side than that at the leading side or by setting a sectional area of a magnetic circuit of the magnetic head larger at a plane forming the gap of the magnetic head at the trailing side than that at the leading side.

An advantage of the magnetic head of the invention is that recording and reproduction characteristics at a high linear recording density region can be improved remarkably when mounted to a magnetic recording and reproduction apparatus to record signals at a higher recording density than previously.

An advantage of a magnetic recording and reproduction apparatus of the invention is that it is more compact and has a higher recording capacity.

A further advantage of a magnetic recording and reproduction apparatus of the invention is that a consumption power of a magnetic recording and reproduction apparatus can be reduced.

BRIEF DESCRIPTION OF THE DRAWINGS

These and other objects and features of the present invention will become clear from the following description taken in conjunction with the preferred embodiments thereof with reference to the accompanying drawings, and in which:

FIG. 11B is a sectional view of a core along a direction 88 of head motion or sliding relative to a medium;

DETAILED DESCRIPTION OF THE PREFERRED EMBODIMENTS OF THE INVENTION

Figure 1:
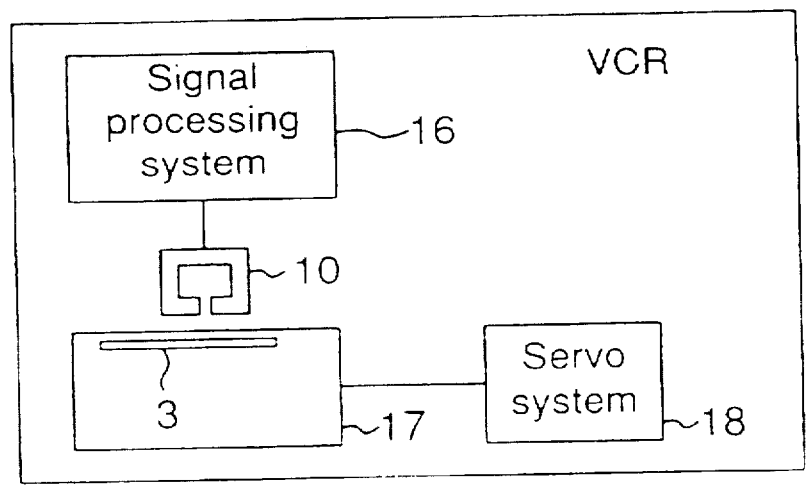
FIG. 1 is a schematic block diagram of a video cassette recorder.

Referring now to the drawings, wherein like reference characters designate like or corresponding parts throughout the views, embodiments of the invention are explained. In a process for recording an obliquely oriented magnetic recording medium having a high coercive force with a prior art ring-type magnetic head, the head is required to have a recording magnetic field high enough to reverse magnetization sufficiently in the magnetic recording medium. That is, if the saturation magnetic flux density of a soft magnetic material included in the magnetic head increases, recording performance becomes better and a higher reproduction output can be provided. However, when an ability of reversing magnetization becomes sufficient for a magnetic recording medium, remarkable improvement of reproduced output cannot be realized any further by a prior art magnetic head even if saturation magnetization of the soft magnetic material is further increased.

On the contrary, the invention improves magnetic recording and reproduction performance to solve the above-mentioned problems by paying attention to a structure of a magnetic recording and reproduction apparatus where signals are recorded with a ring-type magnetic head to a magnetic recording medium having an axis of easy magnetization oblique with respect to a film normal of a magnetic layer of the magnetic recording medium. FIG. 1 shows a basic system of a video cassette recorder as an example of a magnetic recording and reproduction apparatus including a ring-type magnetic head 10, a signal processing system 16 for recording and reproduction and a servo system 18. The signal processing system 16 sends and receives signals to and from the magnetic head 10, to generate a recording magnetic field for recording and reproducing signals to and from a magnetic recording medium 3 having oblique magnetic anisotropy according to a high degree of crystalline orientation. The apparatus shown in FIG. 1 is produced by converting a commercial video cassette recorder as will be explained below. An evaporation tape produced by a continuous deposition apparatus explained below is used as the magnetic recording medium 3. The magnetic recording medium 3 is loaded in a cassette 17 which can be inserted into the recorder. The cassette 17 is driven by the servo system 18. The above-mentioned magnetic head 10 is mounted to a rotary cylinder wherein the trailing side has a higher saturation magnetic flux density. The signal processing system 16, the cassette 17 and the servo system 18 are known, and they are not explained here except that a recording amplifier, a reproduction amplifier and the like in the signal processing system 16 are also converted in order to record and reproduce signals at higher linear recording density region exceeding the specifications of commercial video cassette recorders. The direction of relative movement of the ring-type magnetic head 10 to the magnetic recording medium 3 in the recorder can be set according to a direction of an evaporation tape when inserted in a commercial cassette. The evaporation tape is inserted into a cassette so that the recording magnetic field near the leading edge and axis of easy magnetization of the evaporation tape are oblique in the magnetic layer at the same side as each other with respect to the film normal of the magnetic layer of the evaporation tape in a normal plane including a direction of relative movement of the ring-type magnetic head to the evaporation tape when signals are written to the evaporation tape.

Figure 2:
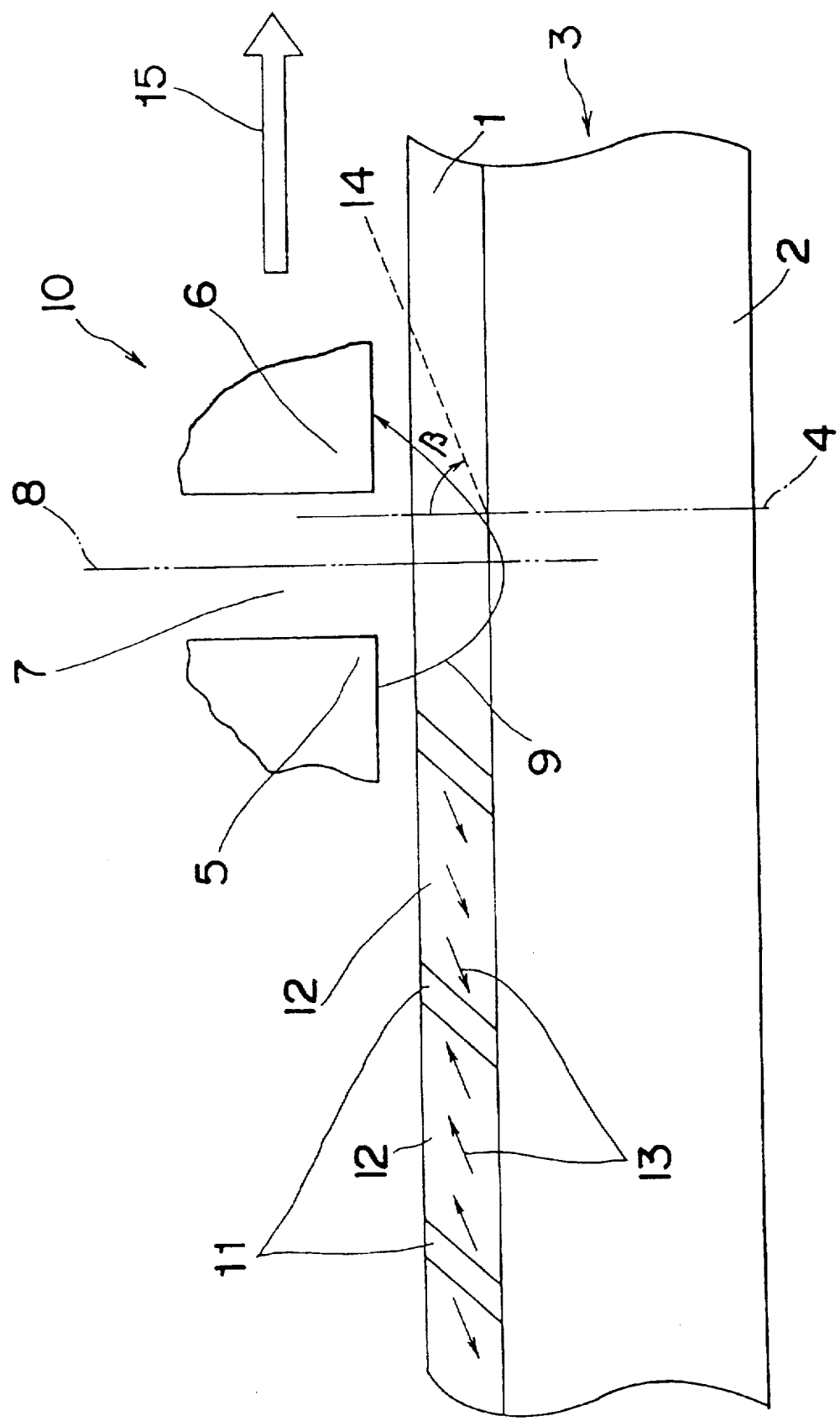
FIG. 2 is a schematic sectional view of a part of the recorder near a magnetic head and an obliquely oriented magnetic recording medium.

Further, FIG. 2 shows an enlarged view around a head gap 7 of the ring-type magnetic head 10. The magnetic head 10 is explained further with reference to the magnetic recording medium 3. The ring-type magnetic head 10 comprises a leading edge 6 and a trailing edge 5. The leading and trailing edges 6, 5 are composed of soft ferromagnetic materials, and the head gap 7 is defined by the surfaces of the soft magnetic materials at the leading and trailing edges 6 and 5. Two opposing planes at the edges 5 and 6 may be denoted as gap-forming planes which define the gap 7. Saturation magnetic flux density $B_{ST}$ at the trailing edge 5 is larger than that $B_{SL}$ at the leading edge 6 ($B_{ST}>B_{SL}$). The magnetic recording medium 3 comprises a substrate 2 and a magnetic layer 1 formed thereon, and the magnetic head 10 is placed above the magnetic layer 1. A recording magnetic field around the leading edge 6 and axis 14 of easy magnetization of the magnetic recording medium 3 are oblique in the magnetic layer 1 at the same side with respect to a film normal 4 of the magnetic layer 1 in a normal plane including a direction 15 of relative movement of the ring-type magnetic head 10 to the magnetic recording medium 3 when signals are written to the magnetic recording medium 3.

The above-mentioned recording mechanism of the invention for enhancing a reproduced output is explained further. A recording magnetic field 9 generates magnetization 13 in the magnetic layer 1 when signals are recorded to the magnetic layer 1. The recording magnetic field near the leading edge 6 and axis 14 of easy magnetization in the magnetic layer 1 are oblique in the magnetic layer 1 at the same side with respect to the film normal 4 of the magnetic layer 1 in a normal plane including the direction 15 of relative movement of the ring-type magnetic head 10 to the magnetic recording medium 3. That is, the direction of the recording magnetic field near the trailing edge is oblique at the same side as axis of hard magnetization in the magnetic layer 1.

It is to be noted that the recording magnetic field 9 is asymmetric with respect to a center line 8 of the head gap 7 and has a steeper gradient in the magnetic layer 1 at the side of the trailing edge 5. That is, a component of the recording magnetic field 9 along the axis 14 of easy magnetization decreases more steeply from the center line 8 of the gap 7 to the trailing edge 5 than the counterpart of symmetric recording magnetic field in the prior art magnetic head. Such asymmetric recording magnetic field generates narrower magnetic transition regions 11 in the magnetic layer 1. The enhancement of a reproduced output in high linear recording density region in the invention is considered to be ascribed to the above-mentioned recording mechanism. Magnetic layer 1 also contains regions 12 of magnetization 13 generated therein. Regions 12 are located on opposite sides of transition regions 11.

In order to realize the above-mentioned recording mechanism, it is needed that the direction of the recording magnetic field 9 at the side of the leading edge 6 and the axis 14 of easy magnetization are oblique in the magnetic layer 1 at the same side with respect to the film normal 4 of the magnetic layer 1 in the normal plane including the direction 15 of relative movement of the ring-type magnetic head 10 to the magnetic recording medium 3 when signals are written to the magnetic recording medium 3. That is, it is needed that the direction of recording magnetic field 9 near the leading edge 6 is close to the axis 14 of easy magnetization while that near the trailing edge 5 is close to the axis of hard magnetization, but it is not needed that the oblique direction of recording magnetic field near the leading edge 6 coincides exactly with the oblique direction of the axis 14 of easy magnetization.

As shown in FIG. 2, each of the angle of easy magnetization 13 of magnetic layer 3, and a direction of recording magnetic field 9 near the leading edge 6 are inclined obliquely with respect to the film normal 4 in the same general direction with respect to each other; however, as stated above, the angle of easy magnetization 13 and the angle of the portion of recording magnetic filed 9 near leading edge 6 need not coincide exactly.

In commercial video cassette recorders, a rotary head scans a magnetic tape along a direction inclined somewhat with respect to the longitudinal direction of the magnetic tape. For example, in Hi-8 video cassette recorders, a head scans a magnetic tape along a direction having an angle of about 5° with respect to the longitudinal direction of the magnetic tape. When the magnetic head 10 scans the magnetic recording medium 3 along a direction inclined somewhat with respect to the longitudinal direction of the magnetic tape as in the above-mentioned recorder, if a direction of recording magnetic field near the leading edge 6 is close to the axis 14 of easy magnetization while that near the trailing edge 5 is close to the axis of hard magnetization, the above-mentioned recording mechanism of the invention improves recording and reproduction characteristics largely In contrast to the invention, if the recording magnetic field direction near the trailing edge 5 and the axis 14 of easy magnetization of the magnetic recording material are oblique in the magnetic layer at the same side, the recording mechanism of the invention is not realized. In this case, because the oblique direction of the recording magnetic field at the trailing side is close to the direction of the axis of easy magnetization, as in the case with previous longitudinal recording, demagnetization on recording increases with decreasing recording wavelength, and excellent high linear recording density characteristic cannot be obtained.

Figure 3:
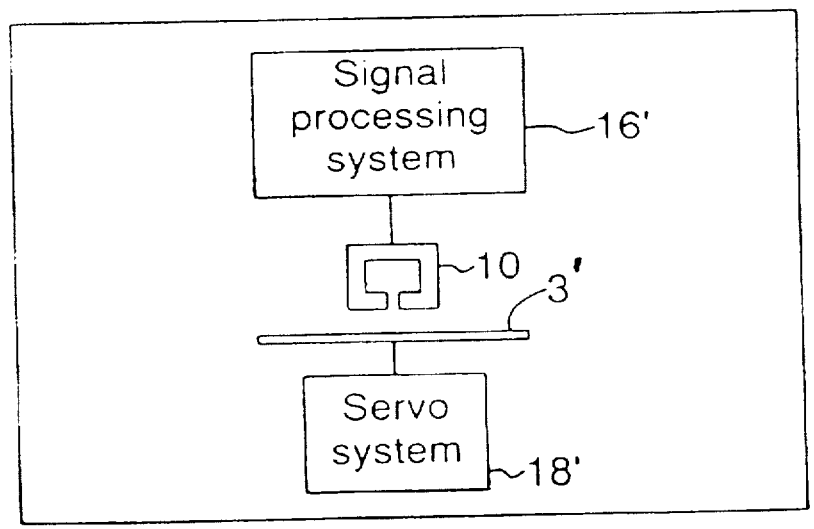
FIG. 3 is a schematic block diagram of a hard disk drive.

Though the above-mentioned embodiment of the invention relates to a video cassette recorder as an example of the magnetic recording and reproduction apparatus, the apparatus is not limited to the video cassette recorder, and various forms of magnetic recording media such as a magnetic card or a magnetic disk can adopt the above-mentioned recording mechanism of the invention. FIG. 3 shows a hard disk drive as an example of the magnetic recording and reproduction apparatus where a magnetic recording medium or a hard disk 3' is used having oblique anisotropy along the circumferential direction of the disk. The drive comprises the ring-type magnetic head 10 for recording and a recording and reproduction system 16' for driving the magnetic head 10 for generating a recording magnetic field for recording. The magnetic recording medium 3' is not included in a cassette, but it is set beforehand at a prescribed position near the ring-type magnetic head 10. The movement of the magnetic recording medium 3' is controlled by a servo system 18'. The recording and reproduction system 16' is known, and it is not explained here.

Evaporation Tape

An evaporation tape having so-called oblique anisotropy is used as the magnetic recording medium 3, as mentioned above. The evaporation tape has a magnetic layer comprising main components of, for example, cobalt and oxygen and having the axis 14 of easy magnetization oblique to the film normal 4.

Figure 4:
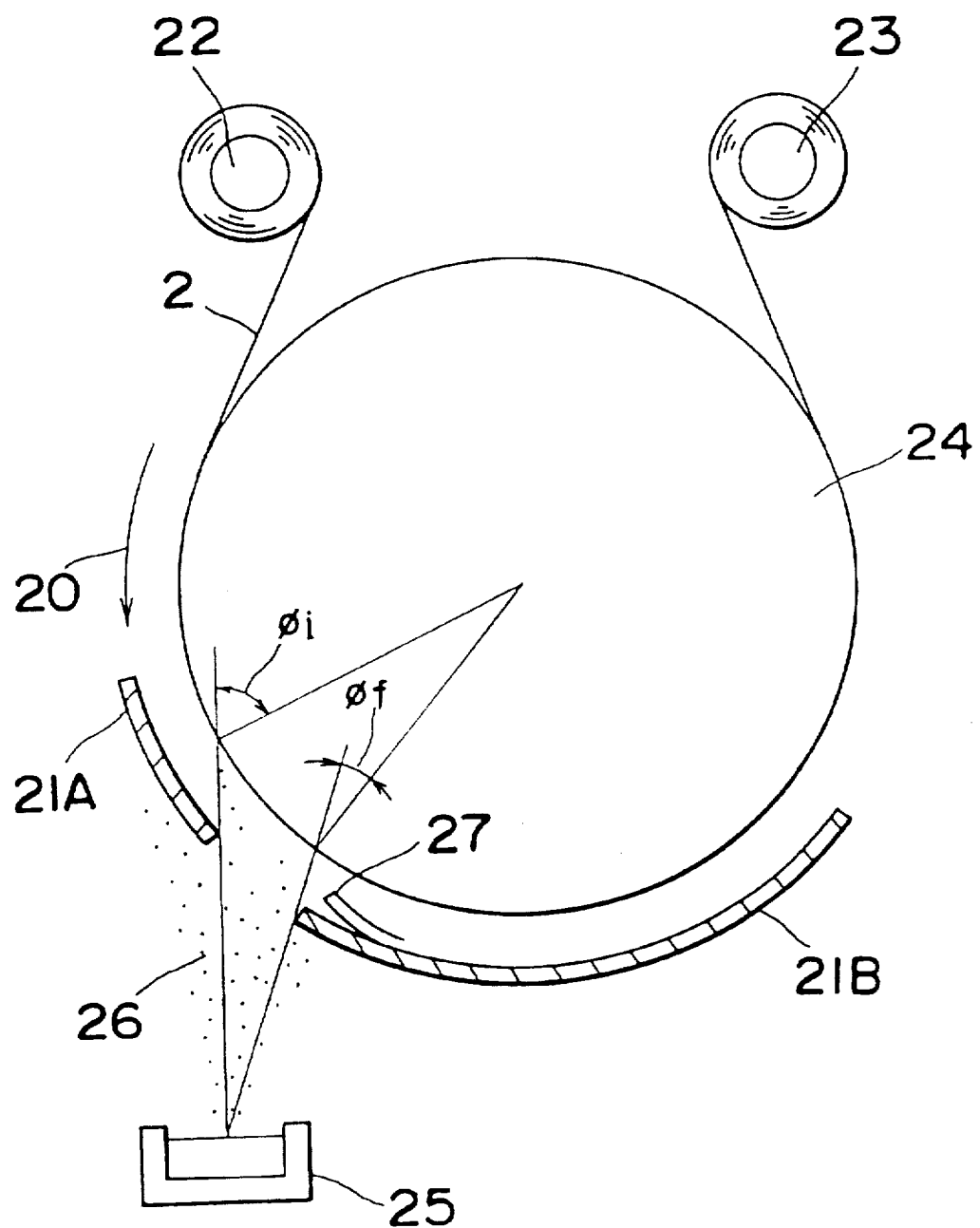
FIG. 4 is a schematic sectional view of a vacuum deposition apparatus for producing an evaporation tape inside a vacuum chamber.

Evaporation tapes can be produced efficiently with a continuous vacuum deposition apparatus using a cylindrical can system shown in FIG. 4. An example of the production method is explained with reference to FIG. 4 showing a structure inside the vacuum deposition apparatus where a magnetic layer 1 is deposited continuously on a moving longitudinal polymer substrate 2. The substrate 2 made of a longitudinal polymer material is supplied from a supply roll 22 and is carried along the circumference of a cylindrical can 24 in a direction of an arrow 20. Atoms evaporated from a source 25 are deposited onto the substrate 2 to form a magnetic layer 1. For example, a Co—Ni alloy is filled in the source 25 when an evaporation tape having main components of cobalt, nickel and oxygen is produced for a high-band Hi-8 Video cassette recorder. Deposition may be performed by using resistor heating, induction heating or the like, while electron beam deposition is suitable especially for evaporating metals such as cobalt having a high melting point at a high evaporation rate. Reference numerals 21A and 21B denote shielding plates for preventing deposition of unnecessary evaporated atoms to the substrate.

The shielding plates 21A and 21B are provided between the evaporation source 25 and the cylindrical can 24, and evaporated atoms 26 are deposited through an opening between them onto the substrate 2. The shielding plates 21A and 21B define incident angles of evaporated atoms 26 onto the substrate 2 in a region from $\phi_i$ at a start portion to $\phi_f$ at an end portion relative to a film normal of the substrate 2 for deposition. An oblique direction of axis of easy magnetization in a deposited magnetic layer is controlled mainly by setting incident angles $\phi_i$ and $\phi_f$. Previously, such a shielding plate 21A is not used for producing an evaporation tape for a Hi-8 video cassette recorder because incident angles of evaporated atoms 16 onto the substrate 2 at the start portion is considered to be preferably 90° relative to the film normal of the substrate preferably. Reference numeral 27 denotes an inlet for introducing oxygen into a vacuum chamber on deposition, while 23 denotes a roll for winding the polymer substrate 2 on which the magnetic layer is formed.

The substrate 2 is used to deposit the magnetic layer 1 thereon. The substrate 2 may be any material which can be used generally for a magnetic tape such as polyethylene terephthalate film, polyethylene naphthalate film, polyimide film, polyamide film, polyether imide film or polycarbonate film. In the present example, a polyethylene terephthalate film of 7 μm thickness is used.

A metal or alloy material to be included in a magnetic film is put in the evaporation source 25. In the present embodiment, cobalt is put in the evaporation source 25 because a magnetic tape having a magnetic layer including main components of cobalt and oxygen is deposited is produced. Reaction deposition is performed by introducing oxygen into the vacuum chamber from the inlet 27 to form a magnetic layer 1 including main components of cobalt and oxygen.

Angles $\phi_i$ and $\phi_f$ denote incident angles at a start portion and at an end portion in the deposition of the magnetic layer. Control of $\phi_i$ and $\phi_f$ is very important for controlling the oblique direction of the axis of easy magnetization in the magnetic layer and crystalline orientation.

As shown in FIG. 2, an angle β denotes an angle of the axis 14 of easy magnetization against the film normal 4 of the magnetic recording medium 3 having an oblique anisotropy, wherein β is a value measured without correcting effects of demagnetization field for a sample having a surface area sufficiently larger than the thickness of the magnetic layer or having a demagnetization coefficient of about one. In order to observe remarkable advantages of the invention, it is preferable that β of the magnetic recording medium is set between 50° and 85° for magnetic recording media including evaporation films. If β is 85° or more, the axis 14 of easy magnetization is too close to the film plane, it becomes harder to form oblique magnetization mode on recording. That is, as is the case with previous longitudinal recording, demagnetization on recording increases with decrease in recording wavelength due to recording magnetic field at the trailing side, and excellent high linear recording density characteristic cannot be obtained. On the other hand, if β is 50° or less, the axis of easy magnetization becomes too close to the film normal, and demagnetization becomes large on recording and ideal oblique magnetization mode becomes hard to be formed.

Further, in order to observe advantages of the invention largely, it is needed that the magnetic recording medium used for the magnetic recording and reproduction apparatus has a high degree of crystalline orientation and excellent magnetic characteristics. In order to observe a narrow magnetization transition width according to the recording mechanism of the invention, a resolution of the magnetic recording medium 3 itself determining a limit of the magnetic transition width has to be higher. If the magnetic recording medium 3 has an insufficient degree of crystalline orientation or a large dispersion of anisotropy, the magnetic transition width is limited by the resolution of the medium 3 itself before realizing the advantages of the invention. On the contrary, if the magnetic recording medium 3 has a high degree of crystalline orientation or a small dispersion of anisotropy, advantages of the invention can be observed remarkably. From this point of view, it is preferable that the coercive force of the magnetic layer is preferably 80 kA/m or more and a uniaxial anisotropy constant is preferably $10^5$ J/m$^3$ or more. For evaporation tapes produced with the production apparatus shown in FIG. 4, it becomes important to set $\phi_i$ and $\phi_f$ suitably for producing evaporation tapes having a small anisotropy dispersion and a high degree of crystalline orientation. For examples for evaporation tapes including cobalt and oxygen as main components and produced with the production apparatus shown in FIG. 4, β of about 75°, coercive force along axis of easy magnetization of about 145 kA/m, uniaxial anisotropy constant of about $2.8*10^5$ J/m$^3$ are realized with saturation magnetization of 650 kA/m and film thickness of the magnetic layer of about 100 nm.

As to an evaporation tape produced as described above a carbon protection layer of thickness of about 10 nm and a lubrication layer of thickness of about several nanometers are formed on the magnetic film, while a back coat layer of thickness of 0.5 μm is formed on the back plane, in order to use the tape for the magnetic recorder in the embodiment, though not shown explicitly in FIG. 2. Then, the tape is cut to tapes of appropriate width and length, and they are set in commercial cassettes.

Magnetic Heads

Any ring-type magnetic head can also be used as the recording head 10 if recording magnetic field is asymmetric with respect to the center line 8 at the head gap 7 and has a steeper gradient at the trailing side. The ring-type magnetic head 10 comprises first and second magnetic core halves made from ferromagnetic materials, and the first magnetic core half is located at the leading side in the apparatus. The head gap 7 is formed between the first and second magnetic core halves in a magnetic circuit. Either of the three head structures explained below can be used as the ring-type magnetic head 10 having a recording magnetic field asymmetric with respect to the head gap 7 and having a steeper gradient at the side of the trailing edge 5.

In a first head structure, it is a feature of the magnetic head that saturation magnetic flux density of the magnetic material of the first magnetic core half is smaller than that of the second magnetic core half at and near the gap 7, and the first magnetic core half is set at the leading side. In this structure, by increasing a difference of saturation magnetic flux density between metallic soft magnetic films included in the two magnetic core halves sufficiently, a portion of a magnetic recording medium 3 around the gap 7 at the first magnetic core half at the leading side becomes easier to reach magnetic saturation, and asymmetric magnetic field in the magnetic recording medium 3 is produced which is steeper at the trailing side with respect to the gap center line 8.

A second head structure comprises a metal-in-gap type (hereinafter referred to as MIG type) magnetic head, and soft magnetic films are coated ferromagnetic ferrite cores at opposing faces to form the head gap 7. A feature of the ring-type magnetic head 10 is that an average film thicknesses of the metallic soft magnetic film coated on the surface at an opposing plane of the first magnetic core half is smaller than that of the second magnetic core half, and the first core half is set at the leading side. In this head structure, by increasing a difference of film thickness of the metallic soft magnetic film between the two magnetic core halves sufficiently, a portion of a magnetic recording medium 1 around the gap 7 at the first magnetic core half at the leading side becomes easier to reach magnetic saturation, and asymmetric magnetic field in the magnetic recording medium 1 is produced which is steeper at the trailing side with respect to the gap center line 8.

In a third head structure, it is a feature that a cross section of a magnetic circuit of the first magnetic core half at an opposing plane to form the gap 7 is smaller than that of the second magnetic core half, and the first magnetic half is set at the leading side. In this structure, a portion of a magnetic recording medium 1 around the gap at the first magnetic core half at the leading side becomes easier to reach magnetic saturation, and asymmetric magnetic field in the magnetic recording medium 1 is produced which is steeper at the trailing side with respect to the gap center line.

Among the three head structures explained above, the third one has the smallest effect on the steepness of the asymmetric magnetic field gradient, and it is difficult to attain the advantages of the invention by the third head structure alone. Therefore, it is preferable usually to combine the third head structure with the first one. If the third magnetic head is of MIG type, the third head structure may be combined with the second one.

For a magnetic head of MIG type, if the first head structure is combined with the second one, the advantages of the invention become more remarkable. Further, if the three head structures are combined at the same time, the advantages of the invention become still more remarkable.

In such a ring-type magnetic head including features of a plurality of head structures explained above at the same time, not only recording and reproduction characteristics are improved, but also the most suitable recording current can be reduced. Thus, consumption power of the recording and reproduction apparatus can be reduced.

As explained above, the ring-type magnetic head 10 can generate a suitable distribution of recording magnetic field for an obliquely oriented magnetic recording medium. Thus, recording and reproduction characteristics at a high linear recording density region can be improved remarkably, and a magnetic recording and reproduction apparatus can record signals at a higher density than previously. Therefore, a magnetic recording and reproduction apparatus which is more compact and has a higher capacity can be provided. Further, according to the invention, a suitable recording current can be decreased to reduce a consumption power of a magnetic recording and reproduction apparatus.

Example of Magnetic Recording and Reproduction Apparatus

Figure 5:
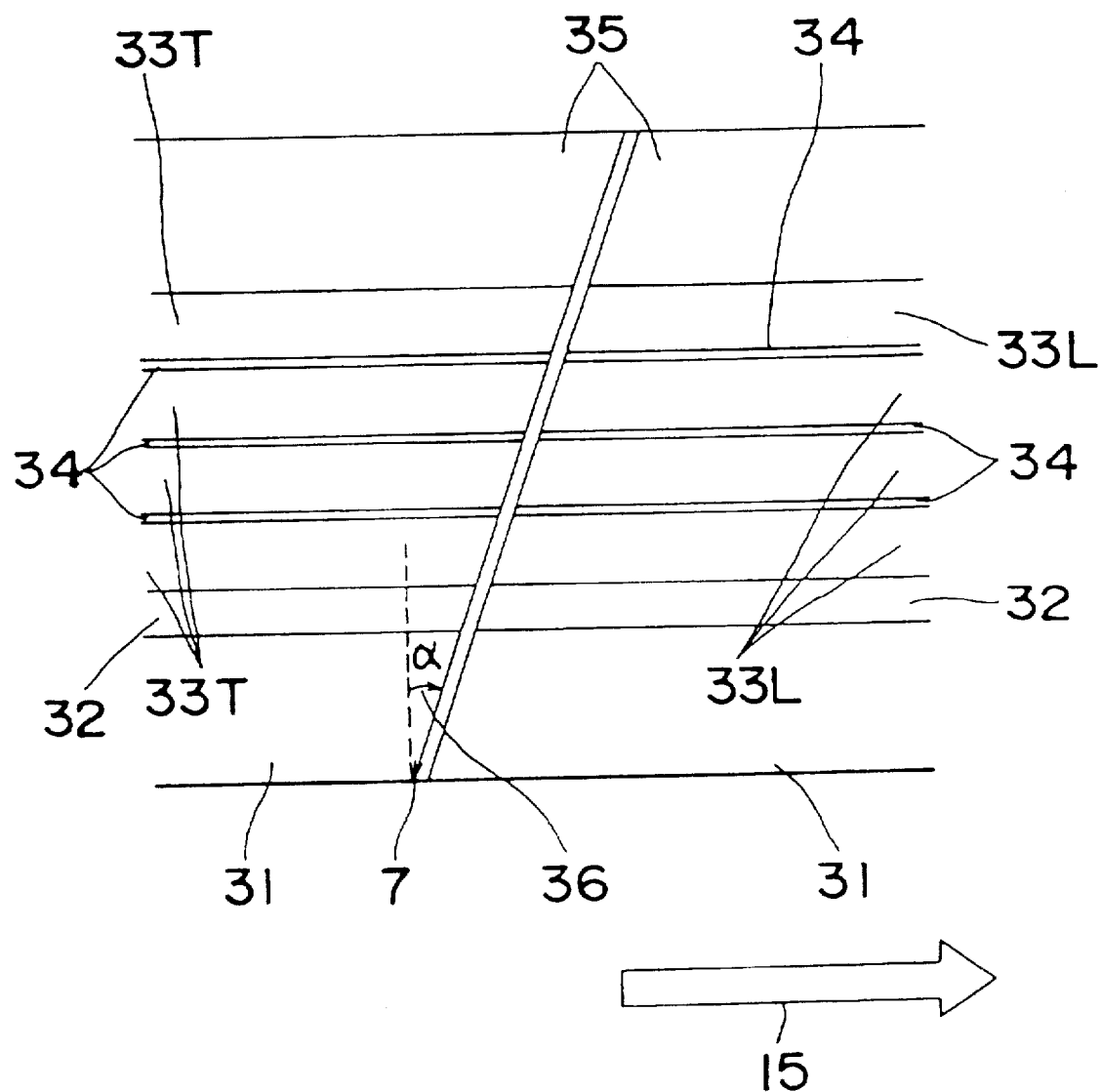
FIG. 5 is a schematic sectional view of an example of a part of a ring-type magnetic head of the invention installed in a magnetic recorder.
Figure 6:
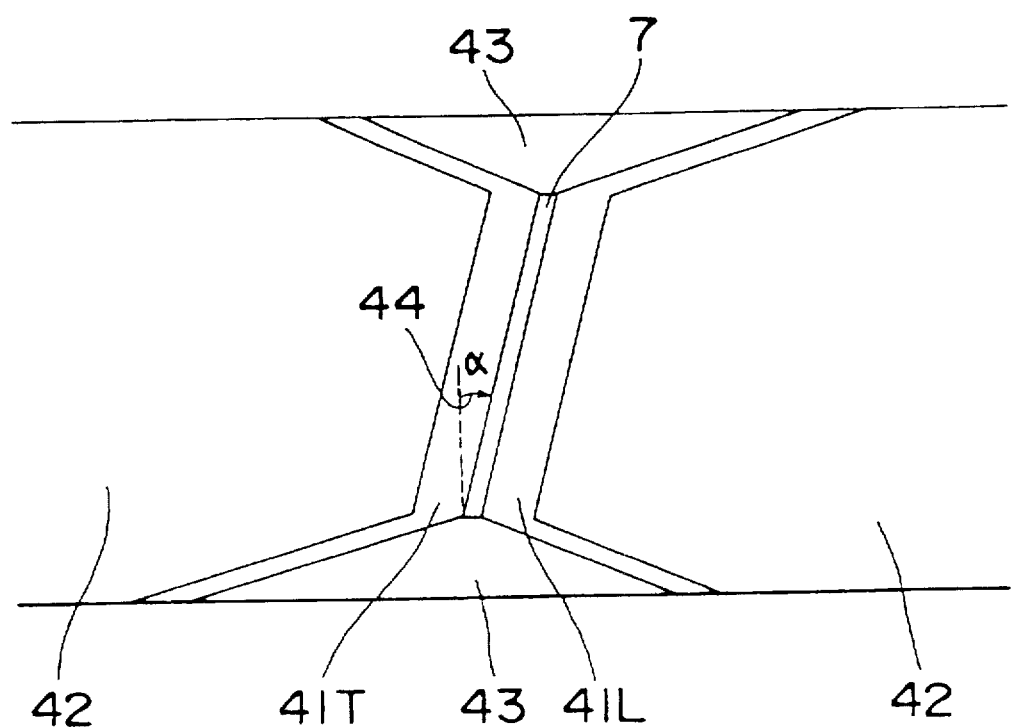
FIG. 6 is a schematic sectional view of an example of a ring-type magnetic head of the invention mounted to the magnetic recorder.
Figure 6:
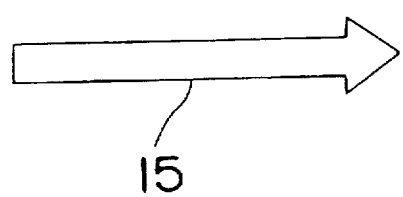

The magnetic recording and reproduction apparatus is explained further. The ring-type magnetic head 10, wherein saturation magnetic flux density at the trailing edge is larger than that at the leading edge, used in the converted video cassette recorder shown in FIG. 1 is explained further. The magnetic head is f or example a magnetic head of laminated type as shown in FIG. 5 or a MIG head as shown in FIG. 6. FIGS. 5 and 6 display magnetic heads only near the head gap 7 viewed from a sliding plane of the head with the magnetic recording medium 3.

In the magnetic head shown in FIG. 5, four metallic soft magnetic films 33L, 33T and three nonmagnetic insulating films 34 are layered alternately on a substrate 35. Then, a glass layer 32 is formed on the last soft magnetic film 33L, 33T and finally a ceramic substrate 31 sandwiches the layered films with the substrate 35. The laminated structure including the insulating films 34 is adopted in order to reduce an eddy current loss when used at high frequencies. The metallic soft magnetic films 33L at the leading side (having saturation magnetic flux density $B_{SL}$) are made of a magnetic material different from that of metallic soft magnetic films 33T at the trailing side (having saturation magnetic flux density $B_{ST}$), and a relation $B_{ST} > B_{SL}$ is satisfied. A narrow head gap 7 is formed aslant between the leading side and the trailing side.

On the other hand, the magnetic head 10 of MIG type shown in FIG. 6 has metallic soft magnetic films 41L and 41T formed on the ferrite cores 42 on the trailing and leading edge portions for defining the head gap 7 of a magnetic circuit of the head. Similarly to the magnetic head 10 shown in FIG. 5, the metallic soft magnetic film 41L at the leading side (having saturation magnetic flux density $B_{SL}$) is made of a magnetic material different from that of metallic soft magnetic films 41T at the trailing side (having saturation magnetic flux density $B_{ST}$) and a relation $B_{ST} > B_{SL}$ is satisfied. Glass portions 43 are filled in the triangular concave portions at two sides.

If the magnetic heads 10 shown in FIGS. 5 and 6 are used for a magnetic recording and reproduction apparatus such as a video cassette recorder, an azimuth angle 36, 44 (shown as α in FIGS. 5 and 6) may be provided in order to reduce effects of crosstalk due to adjacent tracks. By forming the azimuth angle, the head gap 7 is formed along a direction inclined with respect to the direction 15 of relative movement of the magnetic head 10 to the magnetic recording medium 3. Therefore, the azimuth angle 36, 44 as well as scan angle of rotary head to the longitudinal direction of magnetic recording medium 3 in a video cassette recorder is a factor allowing the oblique direction of recording magnetic field near the leading edge not to coincide exactly with the oblique direction of the axis of easy magnetization. However, when an azimuth angle is provided in a practical range, if the oblique direction of recording magnetic field near the leading edge is near the oblique direction of the axis of easy magnetization and the oblique direction of recording magnetic field near the trailing edge is near the oblique direction of the axis of hard magnetization of the medium, the recording mechanism of the invention is realized to improve recording and reproduction characteristics sufficiently.

In order to realize recording ability sufficiently for an obliquely oriented medium having a high degree of crystalline orientation and high coercive force, the recording magnetic field near the leading edge is needed to become large in correspondence to the coercive force of the magnetic recording medium. Therefore, if an obliquely oriented medium having a high degree of crystalline orientation has a coercive force as high as 80 kA/m or more along the direction of the axis of easy magnetization, it is preferable that the saturation magnetic flux density $B_{SL}$ of the metallic soft magnetic films 33L, 41L at the leading side, is 0.8 T or higher. If $B_{SL}$ is lower than 0.8 T, the recording magnetic field at the leading side cannot reverse magnetization sufficiently in the magnetic recording medium, and advantages of the invention are hard to be obtained. Further, because a very high excitation current is needed, the low $B_{SL}$ is also not favorable from a view point of consumption power of the apparatus. In the MIG head shown in FIG. 6, if a metallic soft magnetic film having a high saturation magnetic flux density is formed only at the trailing side while the leading edge comprises only a ferrite core, a structure can be realized more simply that the saturation magnetic flux density of the magnetic material at the trailing edge is larger than that at the leading edge. However, in this case, because the saturation magnetic flux density of the ferrite core is as low as about 0.5 T, advantages of the invention are hard to be obtained as explained above.

Further, in order to provide the recording mechanism of the invention, it is needed that the recording magnetic field is asymmetric with respect to the gap center line and has a steeper gradient at the trailing side. In order to realize such recording magnetic field, it is preferable that the saturation magnetic flux density $B_{ST}$ of the metallic soft magnetic films 33T, 41T at the trailing side is 1.2 times or more larger than $B_{SL}$ of the metallic soft magnetic films 33L, 41L at the leading side. This is understood from recording and reproduction characteristics explained below.

Recording and reproduction characteristics of evaporation tapes are observed by using the above-mentioned apparatus. The characteristics are measured in following conditions: relative speed of magnetic head to magnetic tape of 3.8 m/sec, track pitch of 10 μm, azimuth angle of 15°, and scan angle of about 5° of magnetic head to longitudinal direction of magnetic tape. On recording, the magnetic head is excited by a square wave current.

Figure 7:
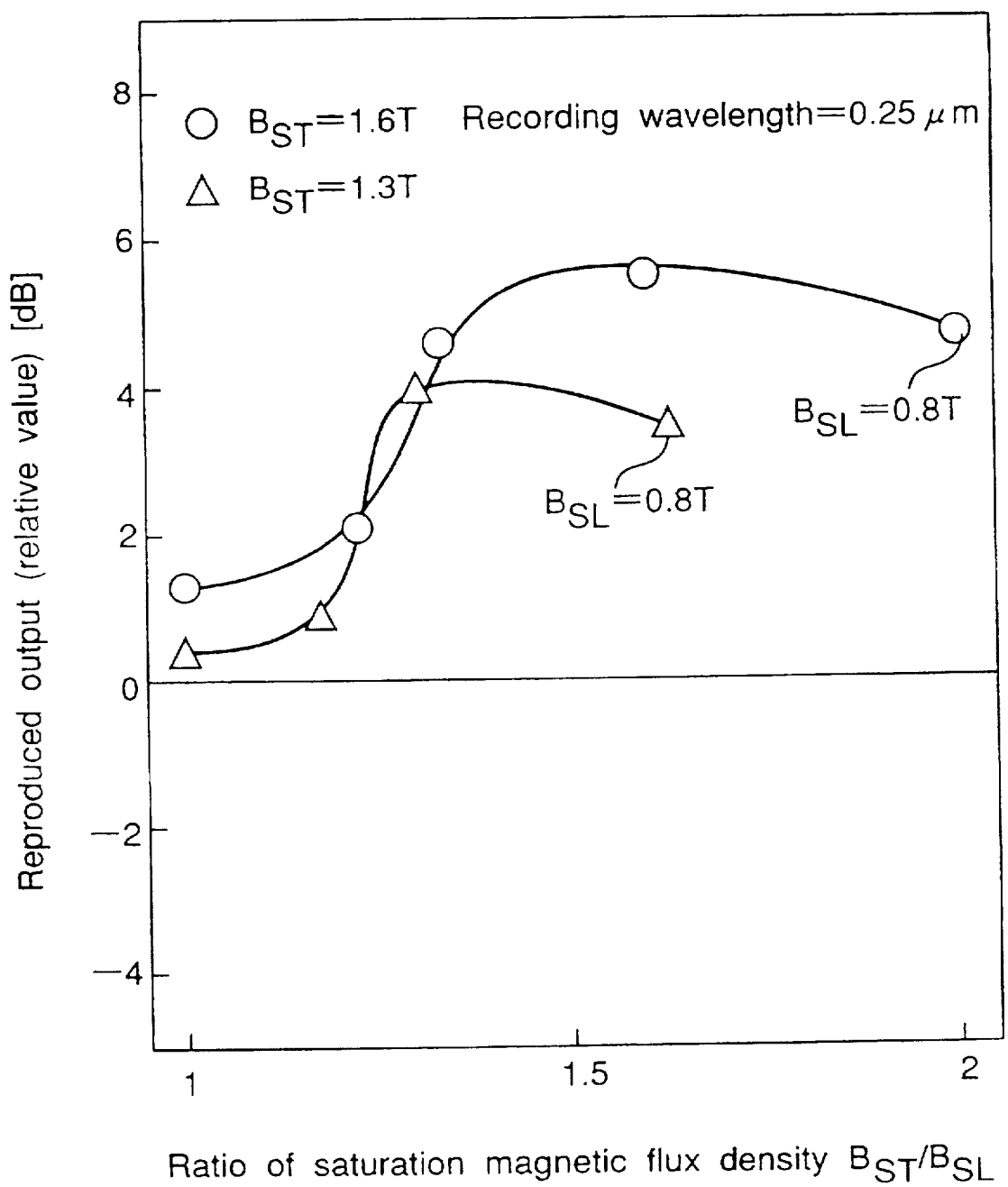
FIG. 7 is a graph of a reproduced output plotted against a ratio of saturation magnetization density.

FIG. 7 shows a graph of reproduced output at recording wavelength 0.25 μm measured by the recorder of the embodiment plotted against a ratio of saturation magnetization density $B_{ST}/B_{SL}$ (a ratio of saturation magnetization density $B_{ST}$ at the trailing side to $B_{SL}$ at the leading side) when the saturation magnetization density $B_{ST}$ at the trailing side is fixed at 1.6 T and at 1.3 T while $B_{SL}$ at the leading side is changed. An evaporation tape has coercive force $H_C$ of 145 kA/m along axis of easy magnetization and uniaxial anisotropy constant of $2.8*10^5$ J/m³. The gap length of the magnetic head is set at 0.15 μm, and the two magnetic heads of laminated and MIG types shown in FIGS. 5 and 6 are used. FIG. 7 shows that the reproduced output increases remarkably in a region where the ratio $B_{ST}/B_{SL}$ exceeds 1.2. In a previous head where the same high saturation magnetic flux material is used at the trailing and leading sides ($B_{ST}/B_{SL}=1$), even if the saturation magnetic flux density is increased up to 1.6 T, the reproduced output does not increase remarkably in contrast to the embodiment. Therefore, it is found that the magnetic recorder has better performance than the previous one. In the conditions of FIG. 7, when $B_{SL}/B_{ST}$ is increased while fixing the saturation magnetization density $B_{ST}$ at the trailing side at 1.6 T and at 1.3 T, the saturation magnetic flux density $B_{SL}$ at the leading side has to be decreased. However, as described above, if $B_{SL}$ is not sufficiently large for the coercive force of the magnetic recording medium, the recording magnetic field at the leading side cannot reverse magnetization sufficiently in the magnetic recording medium In FIG. 7, the reproduced output lowers somewhat if $B_{SL}$ is decreased to 0.8 T in order to increase $B_{SL}/B_{ST}$ because the magnetic recording medium has coercive force as high as 145 kA/m along the axis of easy magnetization. However, even in such cases, the embodiment is superior sufficiently to the previous recorder ($B_{ST}/B_{SL}=1$).

Figure 8:
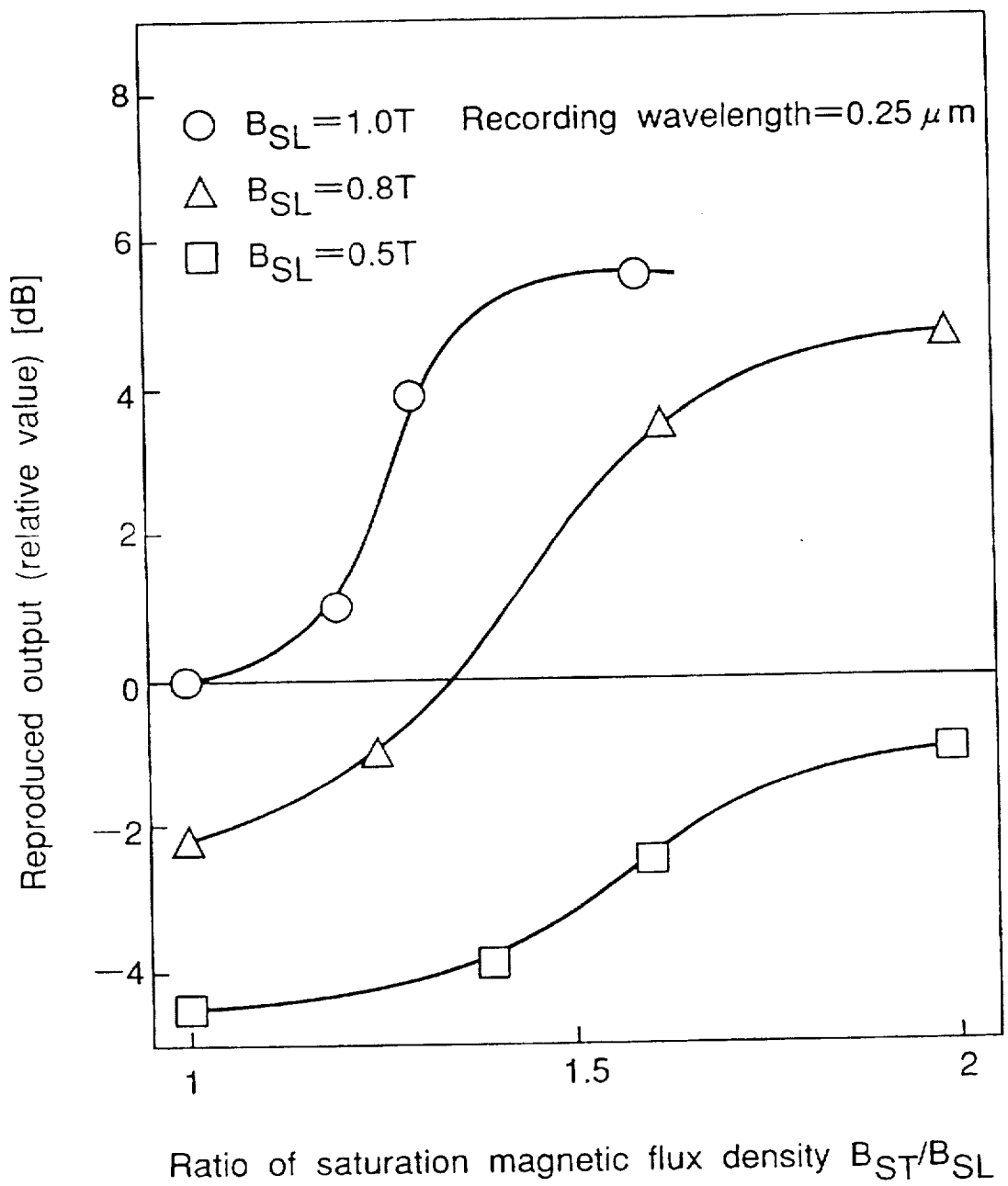
FIG. 8 is a graph of a reproduced output plotted against a ratio of saturation magnetization density.

FIG. 8 shows a graph of reproduced output at recording wavelength 0.25 μm measured by the recorder of the embodiment plotted against a ratio of saturation magnetization density $B_{ST}/B_{SL}$ (a ratio of saturation magnetization density $B_{ST}$ at the trailing side to $B_{SL}$ at the leading side) when the saturation magnetization density $B_{SL}$ at the leading side is fixed at 1.0, 0.8 and 0.5 T while $B_{ST}$ at the trailing side is changed. An evaporation tape has coercive force $H_C$ of 145 kA/m along axis of easy magnetization and uniaxial anisotropy constant of $2.8*10^5$ J/m³, similarly the above-mentioned case shown in FIG. 7. The gap length of the magnetic head is set at 0.15 μm, and the two magnetic heads of laminated and MIG types shown in FIGS. 5 and 6 are used. If the saturation magnetic flux density $B_{SL}$ at the leading side is 0.5 T, the reproduced output is lower remarkably than in other conditions, and even if the ratio $B_{ST}/B_{SL}$ is increased, a rate of increase in the reproduced output is small. Further, in such a magnetic head, an excitation current of about three times as large as the other heads is needed, and it is hard to be used practically from a view point of consumption power. Therefore, for a magnetic recording medium having a high coercive force as in the embodiment, it is preferable that $B_{ST}/B_{SL}$ is large and that $B_{SL}$ at the leading side is 0.8 T or more.

FIGS. 7 and 8 show data when the recording head is also used as a reproduction head. Then, by using a drum tester, measurements are performed by using the same reproduction head for all kinds of recording heads, and measurement results similar to those shown in FIGS. 7 and 8 are observed. Therefore, the results shown in FIGS. 7 and 8 show improvement of recording process according to the invention.

Figure 9:
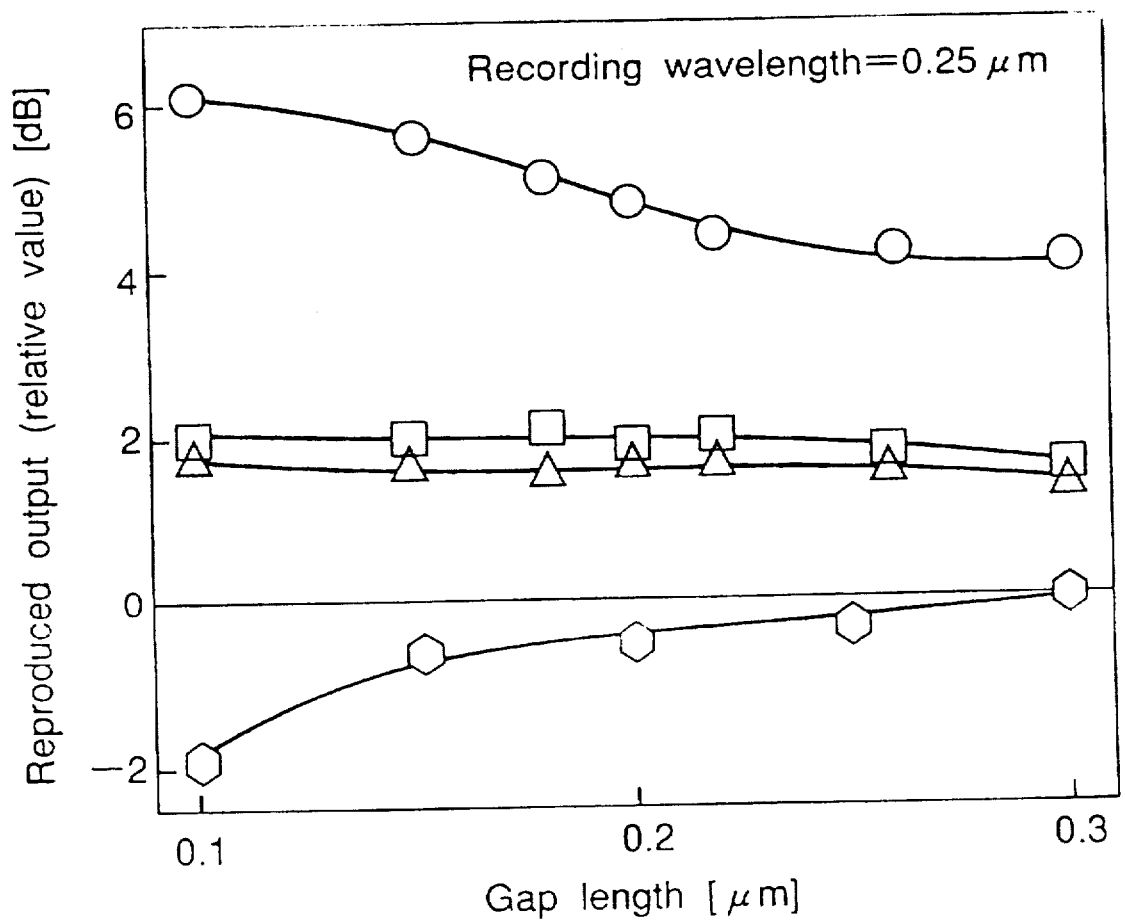
FIG. 9 is a graph of a reproduced output plotted against a gap length.
Figure 9:
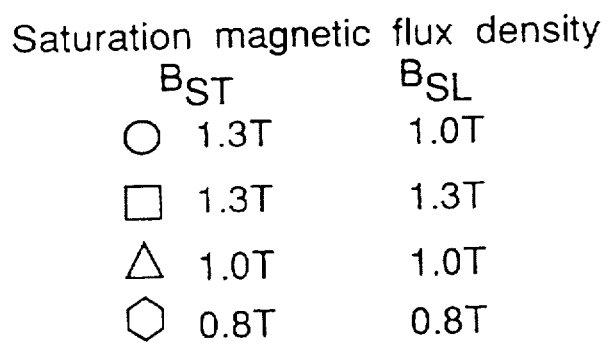

FIG. 9 shows a graph of reproduced output plotted against gap length. An evaporation tape has coercive force $H_C$ of 145 kA/m along axis of easy magnetization and uniaxial anisotropy constant of $2.8*10^5$ J/m³. Similarly to the data shown in FIGS. 7 and 8, data shown in FIG. 9 are observed when the recording head is also used as the reproduction head. Therefore, the reproduced output is corrected by taking gap loss on reproduction into account. By using the magnetic head, the reproduced output increases with decrease in gap length in a region where the gap length is about 0.22 μm or less. On the other hand, in a prior art magnetic head where the same high saturation magnetic flux material is used at the trailing and leading sides ($B_{ST}/B_{SL}=1$) even if the gap length is decreased, the reproduced output corrected for the gap loss almost remains the same, or for a relatively small magnetic head having saturation magnetic flux density of 0.8 T, the reproduced output rather decreases with decrease in gap length. The tendency shown in FIG. 9 is also confirmed by measurements using a drum tester to separate recording and reproduction. For the heads according to the invention, it is considered that a gradient of the recording magnetic field along the direction of easy magnetization at the trailing side becomes steeper according to decrease in gap length. Therefore, it is considered that a narrower magnetic transition region is realized by providing a gap length of 0.22 μm or less to increase the reproduced output. Further, in a system where a recording head is also used as a reproduction head, a gap loss on reproduction is decreased, so that the invention has a further advantage.

Figure 10:
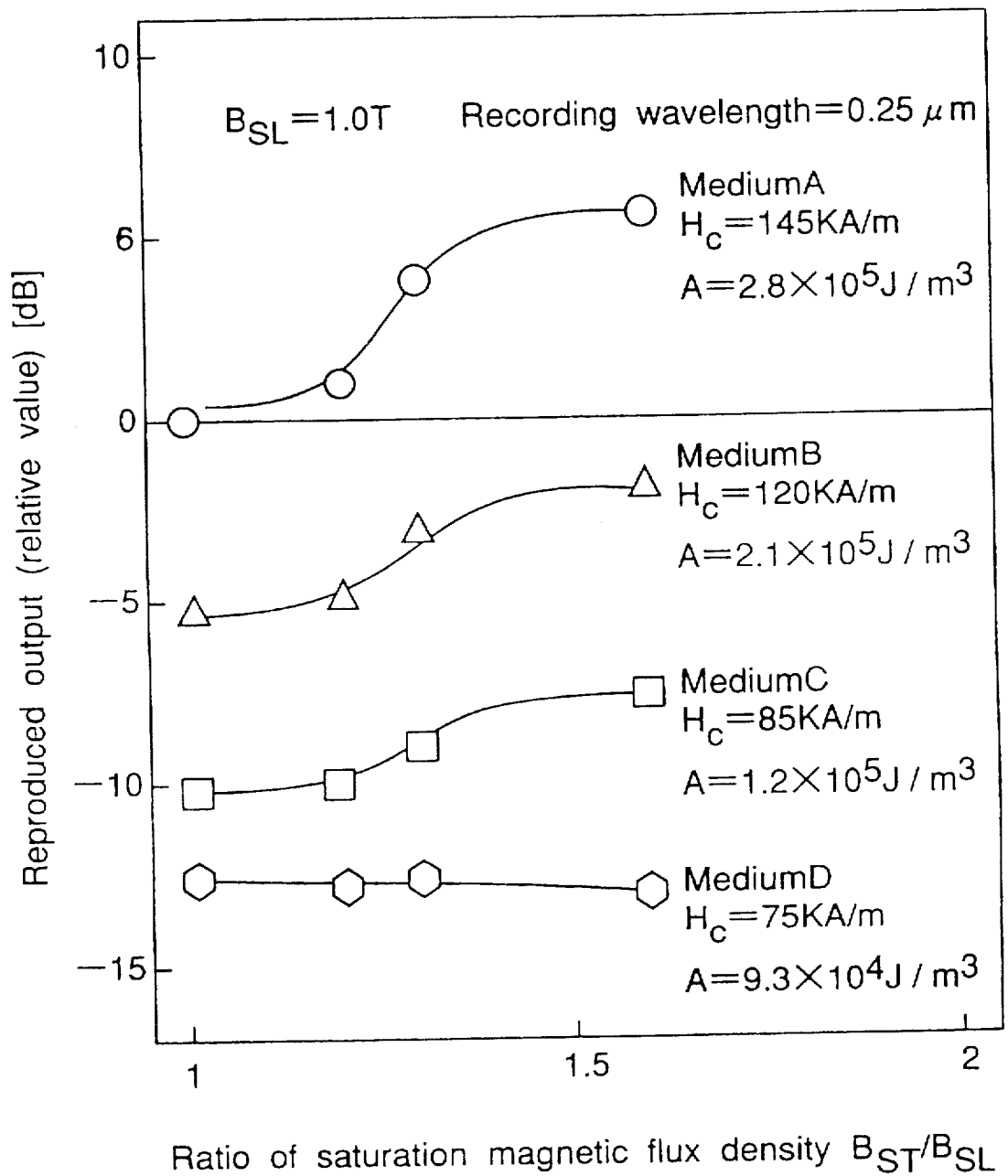
FIG. 10 is a graph of a reproduced output plotted against a ratio of saturation magnetization density.

FIG. 10 shows dependence of reproduced output at wavelength 25 μm plotted on the ratio $B_{ST}/B_{SL}$ or a ratio of saturation magnetization density $B_{ST}$ at the trailing side to $B_{SL}$ at the leading side, for various evaporation tapes. The gap length is 0.15 μm. The coercive force $H_C$ of the magnetic recording media shown in FIG. 10 is a value along the direction of easy magnetization. For magnetic media having coercive force of about 80 kA/m or less and uniaxial anisotropy constant (denoted as "A" in FIG. 10 of $10^5$ J/m$^3$ or less, advantages of the invention are not observed. That is, it is found that in a short recording wavelength region as shown in FIG. 10, magnetic media having a high degree of crystalline alignment are needed to have coercive force $H_C$ of about 80 kA/m or higher and uniaxial anisotropy constant A of $10^5$ J/m$^3$ or more. According to FIG. 10, magnetic media having a high degree of crystalline alignment, a high coercive force and a large uniaxial anisotropy constant has a high reproduced output even if $B_{ST}/B_{SL}$=1. Further, advantages of the invention are obtained more remarkably as a magnetic medium having a high degree of crystalline alignment has a higher coercive force and a larger uniaxial anisotropy constant.

As to noises, noises of the magnetic recording medium detected by the magnetic head are about equal to or less than those by the prior art magnetic head. The head structure of the invention can improve characteristic on recording process due to decrease in magnetic transition width. Therefore, noises are not considered to increase when a reproduced output becomes large. Rather, if noises of the magnetic recording medium are generated by nonuniformity of shapes of magnetic domains at the magnetization transition region, noises are to be reduced due to decrease in width of magnetic transition regions. Therefore, the effect of increase in reproduced output will be reflected to increase in S/N ratio in the magnetic recording and reproduction apparatus.

First Example of Ring-type Magnetic Head

The magnetic head mounted to the magnetic recording and reproduction apparatus of the invention is not limited to those shown in FIGS. 5 and 6. Next, various ring-type magnetic heads which can be mounted to the magnetic recording and reproduction apparatus of the invention are explained below.

In a first example, a ring-type magnetic head of a metal-in-gap type comprises first and second magnetic half cores each coated with a metallic soft magnetic film on a surface of a ferromagnetic ferrite, and a gap of a magnetic circuit exists between the first and second magnetic core halves. An average film thickness of the metallic soft magnetic film of the second magnetic core half at the gap 7 is larger than that of the first magnetic core half.

Figure 11A:
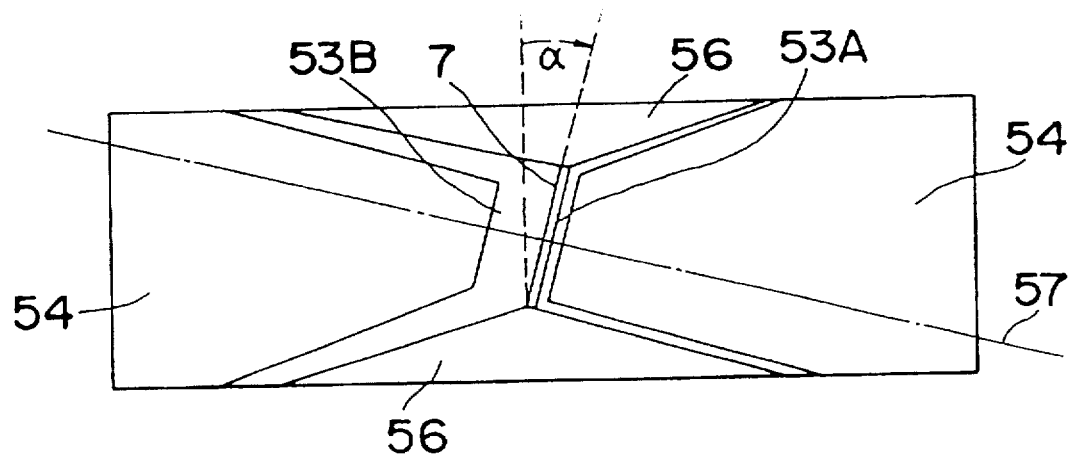
FIG. 11A is a diagram of a medium sliding plane of a magnetic head.
Figure 11B:
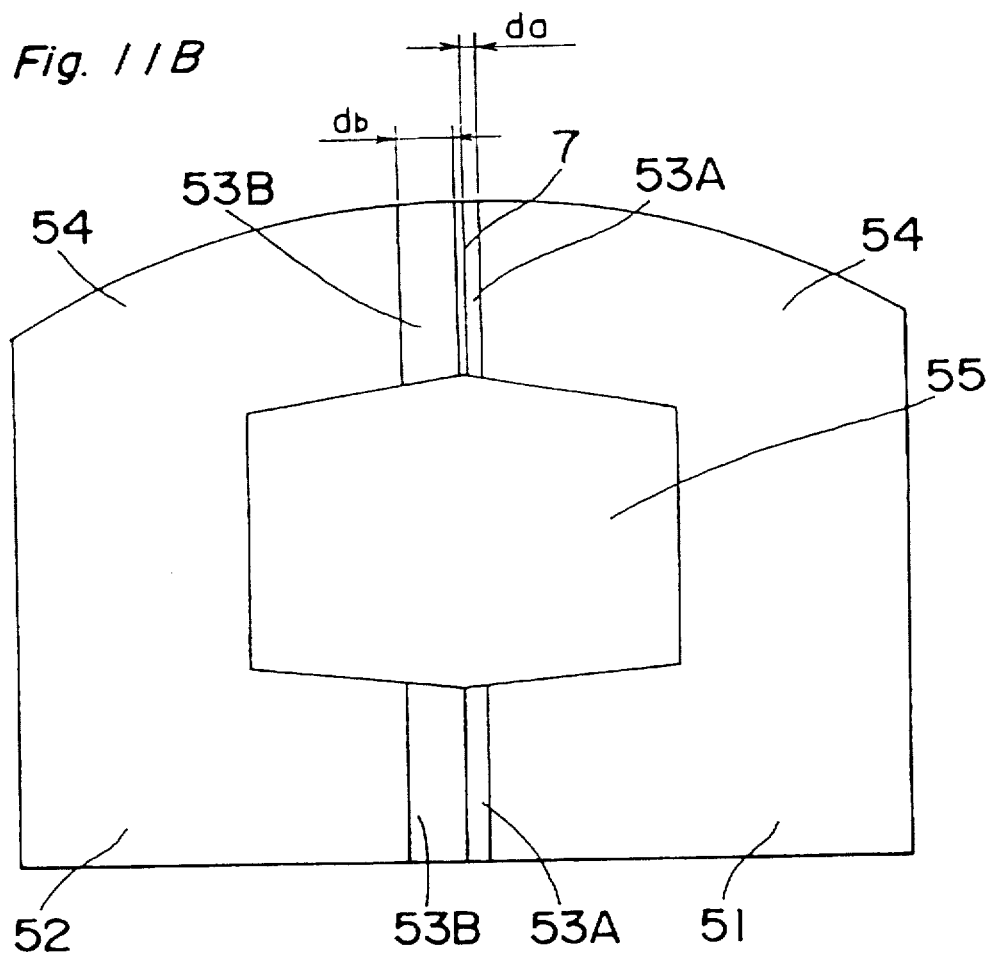
FIG. 11B is a sectional view of a core along a direction 57 of gap length.

FIGS. 11A and 11B show an example of a magnetic head of MIG type of the above-mentioned first example. FIG. 11A shows a plane of the ring-type magnetic head 10 for sliding with a magnetic recording medium, and FIG. 11B shows an example of core section along a direction 57 of gap length. According to this structure, in a recording process, the first magnetic core half 51 is set at the leading side, while the second one 52 is set at the trailing side. Metallic soft magnetic films 53A and 53B are formed on ferrite portions 54 and forms a narrow gap 7 between them. The two ferrite portions 54 have symmetrical forms to form a winding window 55 between them. Similarly to the magnetic head shown in FIG. 6, glass portions 56 are filled in the triangular concave portions at two sides, and an azimuth angle α is provided between a direction along the gap 7 and a head core width direction to the magnetic head.

The film thickness of the metallic soft magnetic films 53A and 53B of the first and second magnetic core halves 51, 52 are measured along the direction 57 of gap length, and they are denoted as $d_a$ and $d_b$ in FIG. 11B. The average film thicknesses are obtained as averages of $d_a$ and $d_b$ along the direction 57 of gap length. As shown in FIGS. 11A and 11B, the average film thickness $d_a$ of the metallic soft magnetic film 53A coated on the surface at the gap 7 of the second magnetic core half 52 is larger than that of the first magnetic core half 51, so that the recording magnetic field becomes asymmetric with respect to the center line of head gap 7 and has a steeper gradient at the trailing edge side.

Preferably, the metallic soft magnetic film 53A (having saturation magnetic flux density $B_{SA}$) coated on the first magnetic core half 51 is made of a magnetic material different from that of the metallic soft magnetic film 53B (having saturation magnetic flux density $B_{SB}$) coated on the second magnetic core half 52, and $B_{SB}>B_{SA}$ is satisfied. Then, the degree of asymmetry of recording magnetic field becomes still larger, and magnetic field gradient at the trailing edge side becomes still larger.

In order to perform sufficient recording ability for the obliquely oriented magnetic recording medium 3 having a high degree of crystalline orientation and a high coercive force, it is needed that a recording magnetic field at the leading edge side can reverse magnetization sufficiently for the medium. If recording is carried out on an obliquely oriented magnetic recording medium having coercive force of 80 kA/m or more along direction of easy magnetization, it is preferable that saturation magnetic flux density $B_{SA}$ of the metallic soft magnetic film 53A coated on the first magnetic core half 51 at the leading side is 0.8 T or more. If $B_{SA}$ is smaller than 0.8 T, the recording magnetic field at the leading side cannot reverse magnetization sufficiently so that advantages of the invention is hard to be realized. Further, a very large excitation current is needed, and this is not favorable for a view point of consumption power. Even if $B_{SA}$ is larger than 0.8 T, the ability to reverse magnetization becomes smaller as an average film thickness of the metallic soft magnetic film 53A decreases. In order to obtain the ability to reverse magnetization sufficiently, the average film thickness of the metallic soft magnetic film 53A is found to be 15 μm or more.

In the head shown in FIGS. 11A and 11B, in order to realize the magnetic head 10 where the recording magnetic field becomes asymmetric with respect to the center line of the gap 7 and has a steeper gradient at the trailing side, an average film thickness of the metallic soft magnetic film 53B coated on the plane of the second magnetic core half 52 is made larger than that of the metallic soft magnetic film 53A. In such a structure, if the saturation magnetic flux density $B_{SB}$ of the metallic soft magnetic film 53B coated on the second magnetic core half 52 is about the same as $B_{SA}$ of the metallic soft magnetic film 53A of the first magnetic core half 51, it is needed that an average film thickness of the metallic soft magnetic film 53B is twice or more as large as that of the metallic soft magnetic film 53A, in order to realize advantages of the invention. As explained above, an average film thickness of the metallic soft magnetic film 53A at the gap of the first magnetic core half 51 is needed to be 1.5 μm or more, and the average film thickness of the metallic soft magnetic film 53B is needed to be 3 μm or more. On the other hand, if the average film thickness of the metallic soft magnetic film 53B is too large, a high frequency loss is generated due to eddy current. Therefore, it is important to set a suitable film thickness by taking into account a structure of the head and a wavelength range used for a magnetic recording and reproduction apparatus using the magnetic head.

Further, in the above-mentioned magnetic head, if saturation magnetic flux density $B_{SB}$ of the metallic soft magnetic film 53B of the second magnetic core half 52 is larger than $B_{SA}$ of the metallic soft magnetic film 53A of the first magnetic core half 51, the metallic soft magnetic film 53B formed at the gap of the second magnetic core half 52 has saturation magnetic flux density 1.2 or more times as large as the metallic soft magnetic film formed at the gap of the first magnetic core half 51, in order to obtain advantages of the invention more remarkably. If $B_{SB}$ is smaller than 1.2 times $B_{SA}$, an effect to enhance asymmetry of recording magnetic field and improvement of recording and reproduction characteristics thereby become hard to be obtained.

As is the case with the magnetic heads shown in FIGS. 5 and 6, the gap length of magnetic head is also a factor to enhance asymmetry of recording magnetic field for obtaining advantages due to recording mechanism of the invention. As gap length becomes smaller, asymmetry of recording magnetic field becomes larger in the magnetic head, and favorable recording and reproduction characteristics can be obtained. It is preferable to obtain advantages of the invention that the gap length is 0.22 µm or less.

Further, if the magnetic head shown in FIGS. 11A and 11B is used, similarly to the head shown in FIGS. 5 and 6, the advantages of the invention depend on the crystalline orientation of the magnetic recording medium 3. In a region of short recording wavelength, it is preferable that the magnetic recording medium 3 has coercive force of about 80 k/m or more, and the uniaxial anisotropy constant of $10^5$ J/m$^3$ or more.

The above-mentioned performance is confirmed experimentally by measuring data on recording and reproduction characteristics, similarly to the results shown in FIGS. 7–10.

A cobalt amorphous alloy film or a Sendust film is preferable, for example, as the metallic soft magnetic film having saturation magnetic flux density of 0.8 T or more. Further, the metallic soft magnetic film having a higher saturation magnetic flux density may also be used such as a cobalt nitride superstructure alloy film having saturation magnetic flux density larger than 1.3 T or an iron microcrystalline film having saturation magnetic flux density larger than 1.5 T.

If the magnetic head also intends to have saturation magnetic flux density $B_{SB}$ of the metallic soft magnetic film 53B larger than $B_{SA}$ of the metallic soft magnetic film 53A further, it is preferable that $B_{SB}$ becomes 1.2 or more times $B_{SA}$. This is realized by using a cobalt amorphous alloy film or a Sendust film having saturation magnetic flux density of about 1 T for the metallic soft magnetic film 53A and a cobalt nitride superlattice film or an iron microcrystalline film having a higher saturation magnetic flux density for the metallic soft magnetic film 53B.

If the magnetic head shown in FIGS. 11A and 11B is used in a magnetic recording and reproduction apparatus such as a video cassette recorder, the azimuth angle may be provided in order to reduce effects of cross talk from adjacent tracks. By using the azimuth angle, a gap 7 is formed along a direction inclined against a direction of relative movement of magnetic head to magnetic recording medium. Therefore, the azimuth angle as well as scan angle of the rotary head to the longitudinal direction of magnetic tape is a factor which allows that the oblique direction of recording magnetic field near the leading edge does not coincide exactly with the oblique direction of the axis of easy magnetization. However, when the azimuth angle is provided in a practical range, if the oblique direction of recording magnetic field near the leading edge is near the oblique direction of the axis of easy magnetization of the medium and the oblique direction of recording magnetic field near the trailing edge is near the oblique direction of the axis of hard magnetization of the medium, the recording mechanism of the invention is realized to improve recording and reproduction characteristics sufficiently.

Figure 12A:
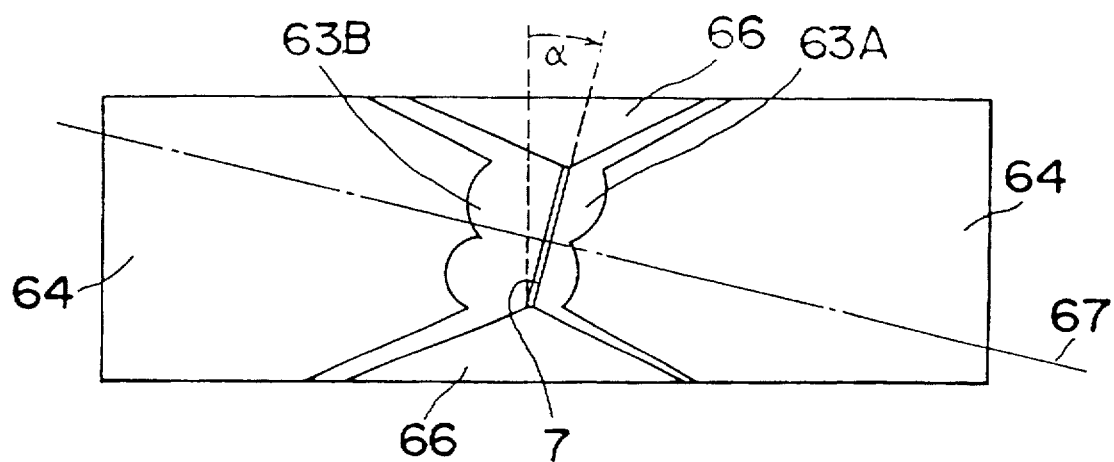
FIG. 12A is a diagram of a medium sliding plane of a magnetic head.
Figure 12B:
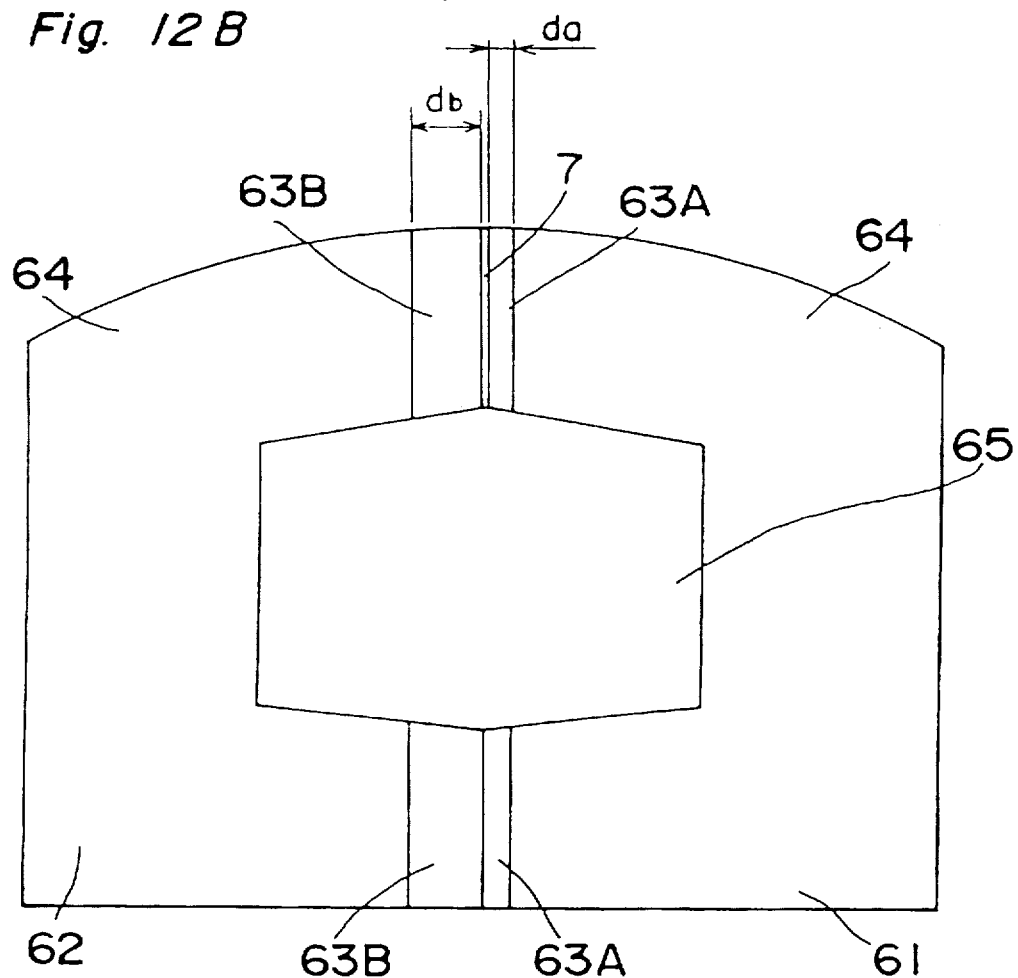
FIG. 12B is a sectional view of a core along a direction 67 of gap length.
Figure 13A:
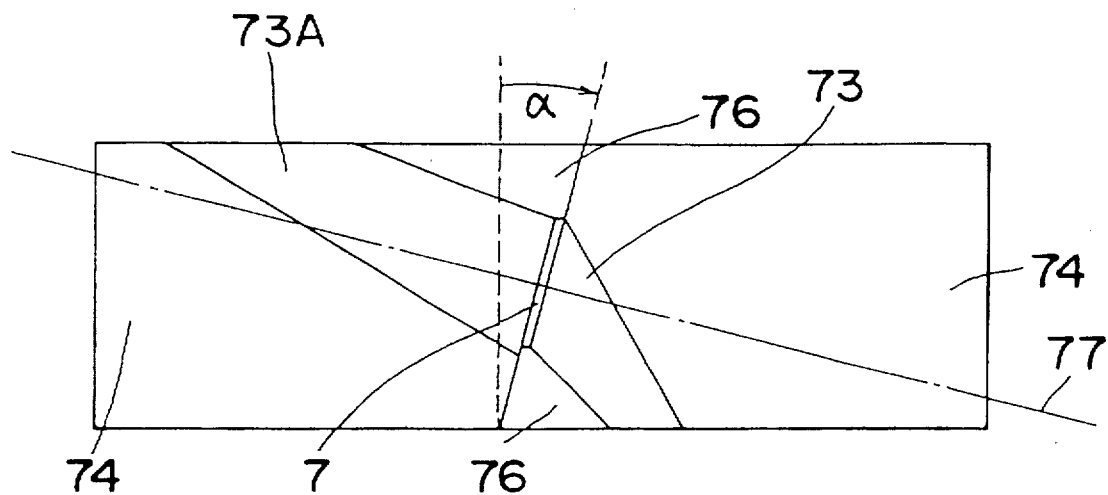
FIG. 13A is a diagram of a medium sliding plans of a magnetic head.
Figure 13B:
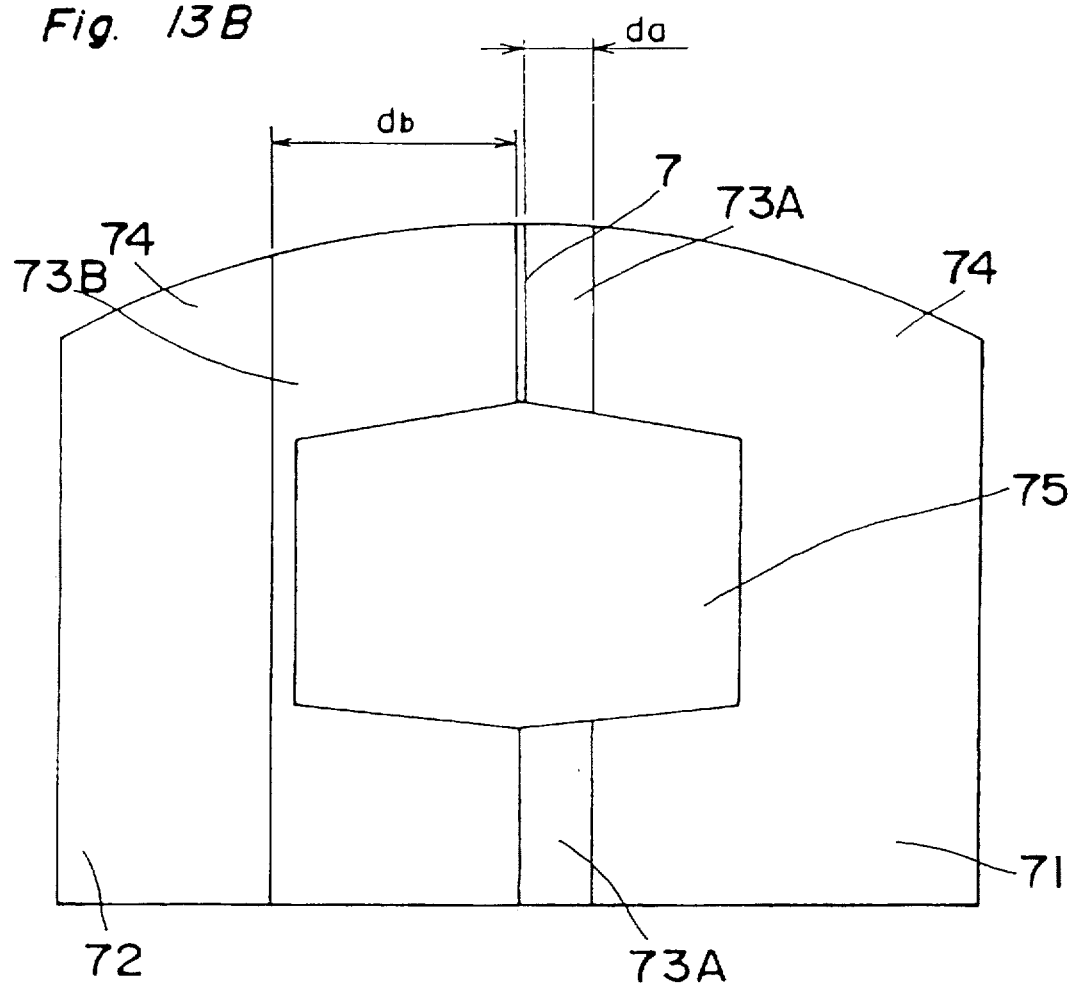
FIG. 13B is a sectional view of a core along a direction 77 of gap length.

FIGS. 12A, 12B and 13A, 13B show modified examples of ring-type magnetic heads of metal-in-gap type comprising first and second magnetic core halves 61, 71 and 62, 72 each coated with a metallic soft magnetic film 63A, 63B, 73A, 73B on a surface of ferromagnetic ferrite portions 64, 74 to form a gap 7 of a magnetic circuit between the first and second magnetic core halves 61, 71 and 62, 72, wherein an average film thickness of the metallic soft magnetic film 63B, 73B coated on a gap-forming plane of the second magnetic core half 62, 72 is larger than that of the first magnetic core half 61, 71, similarly to the magnetic head shown in FIGS. 11A and 11B. However, they have structures different from that shown in FIGS. 11A and 11B. That is, as shown in FIGS. 12A and 13A, interfaces between the metallic soft magnetic films 63A, 63B, 73A, 73B and the ferrite portions 74 extend not in parallel to the gap 7. In the structure shown in FIGS. 12A and 12B, the interface has two arcs near the gap 7. In the structure shown in FIGS. 13A and 13B, the interface is straight along the ferrite portion 74, but it extends aslant to the gap 7. It is known that noises in reproduced signals from a pseudogap formed by nonmagnetic portions at the interface can be reduced by forming interfaces between the metallic soft magnetic films 63A, 73A and 63B, 73B and the ferrite portions 64, 74 not in parallel to the gap 7, as in FIGS. 12A and 13A. In the structures shown in FIGS. 12A, 12B and 13A, 13B, advantages of the invention can be realizes as in the structure shown in FIGS. 11A and 11B by making the average film thickness of the metallic soft magnetic film 63A, 73A 1.5 µm or more and by making the average film thickness of the metallic soft magnetic film 63B, 73B larger than two times that of the metallic soft magnetic film 63A, 73A. An enhancement effect to increase asymmetry of recording magnetic field by making $B_{SB}$ larger than 1.2 or more times $B_{SA}$ is also realized similarly to the case in the magnetic head shown in FIGS. 11A and 11B.

Second Example of Ring-type Magnetic Head

Next, as a second example, a ring-type magnetic head is explained in detail which comprises first and second magnetic core halves with a metallic soft magnetic film to form a gap of a magnetic circuit between the first and second magnetic core halves. Saturation magnetic flux density of a magnetic material of the first magnetic core half at and near the gap is smaller than that near the second magnetic core half at and near the gap, while a cross section of a magnetic circuit of the second magnetic core half at a plane located at the gap is smaller than that of the first magnetic core half.

Figure 14A:
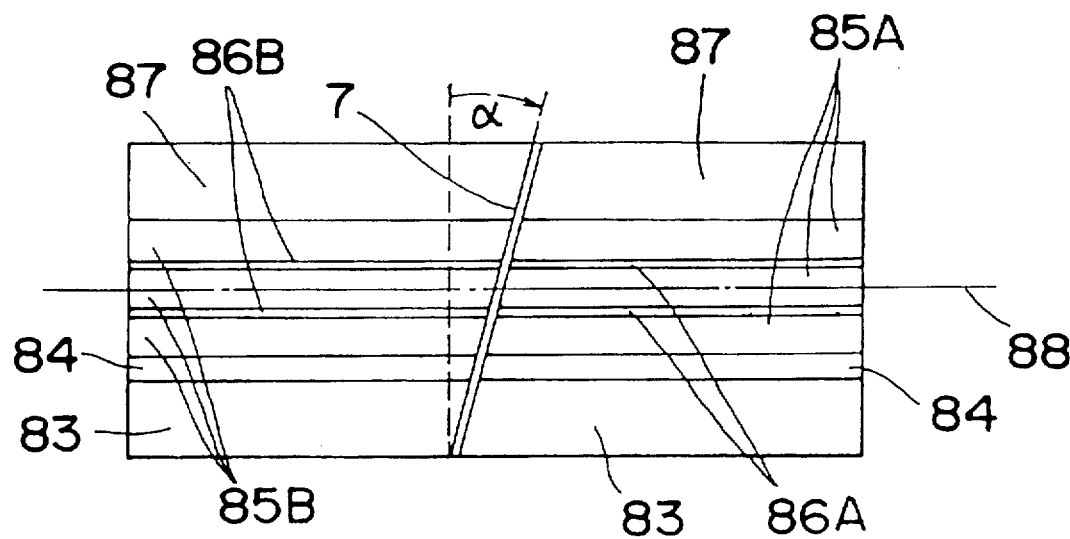
FIG. 14A is a diagram of a medium sliding plane of a magnetic head.
Figure 14B:
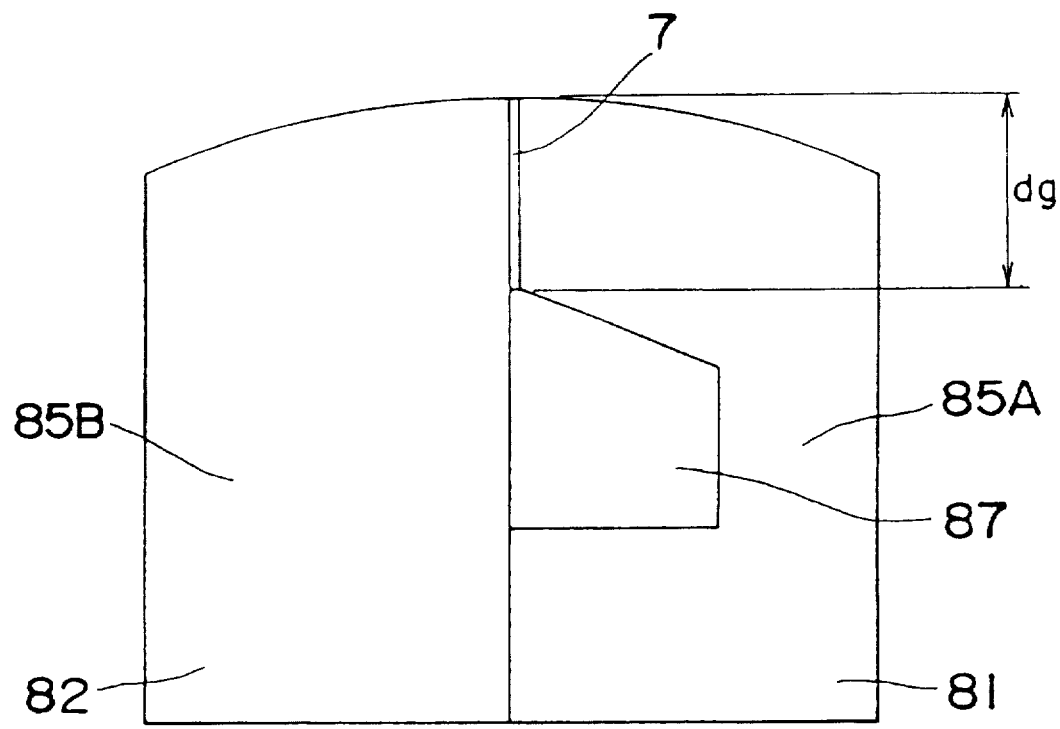
Figure 15A:
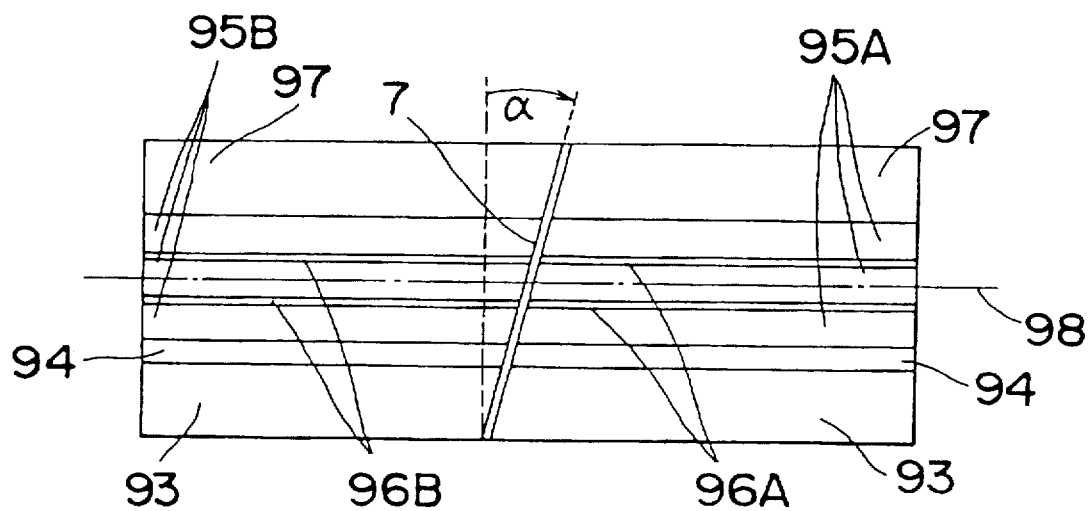
FIG. 15A is a diagram of a medium sliding plane of a magnetic head.
Figure 15B:
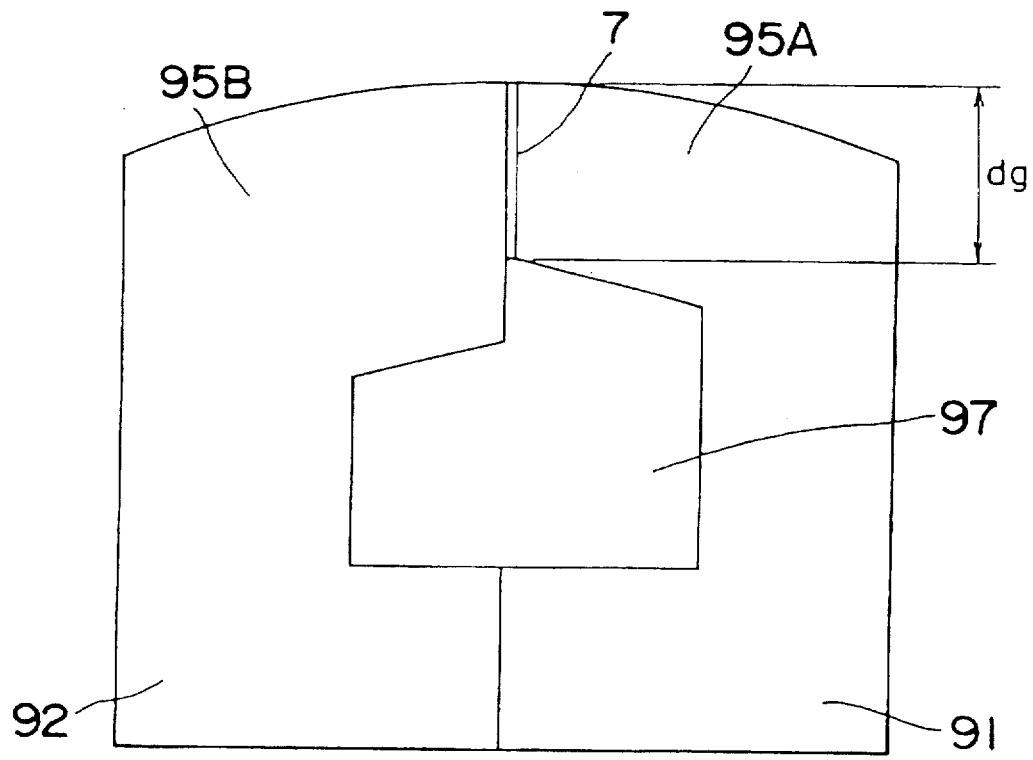
FIG. 15B is a sectional view of a core along a direction 98 of head motion or sliding relative to a medium.
Figure 16A:
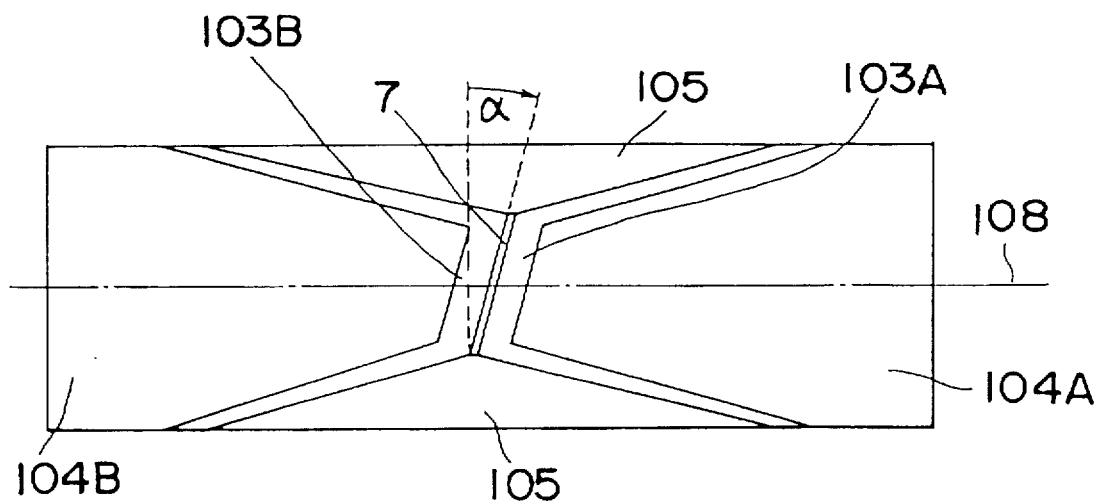
FIG. 16A is a diagram of a medium sliding plane of a magnetic head.
Figure 16B:
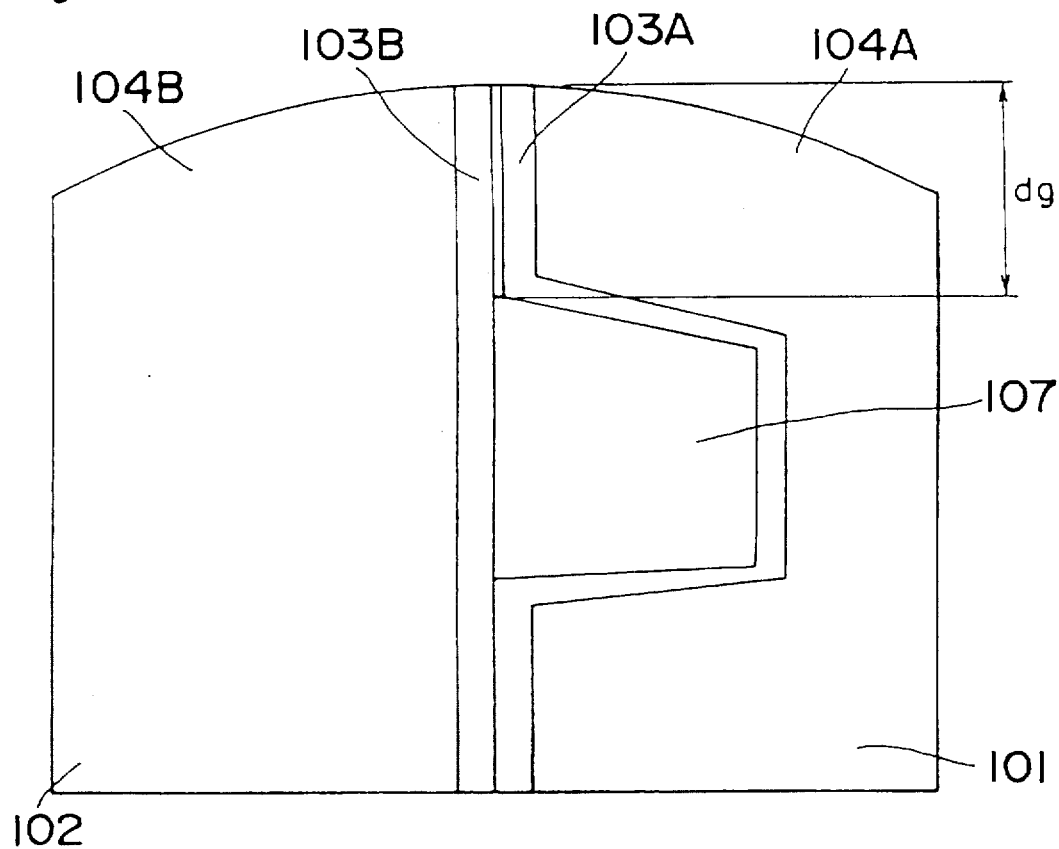
FIG. 16B is a sectional view of a core along a direction 108 of head motion or sliding relative to a medium.
Figure 17A:
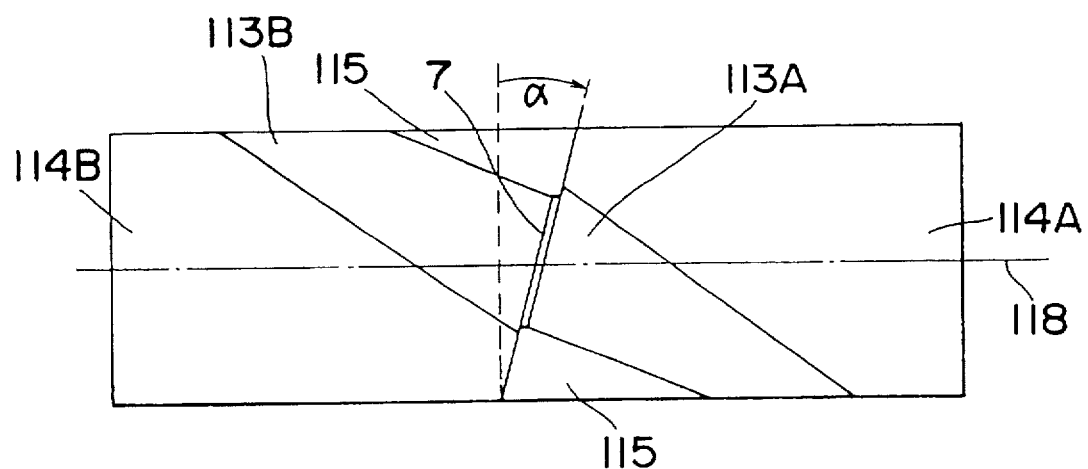
FIG. 17A is a diagram of a medium sliding plane of a magnetic head.
Figure 17B:
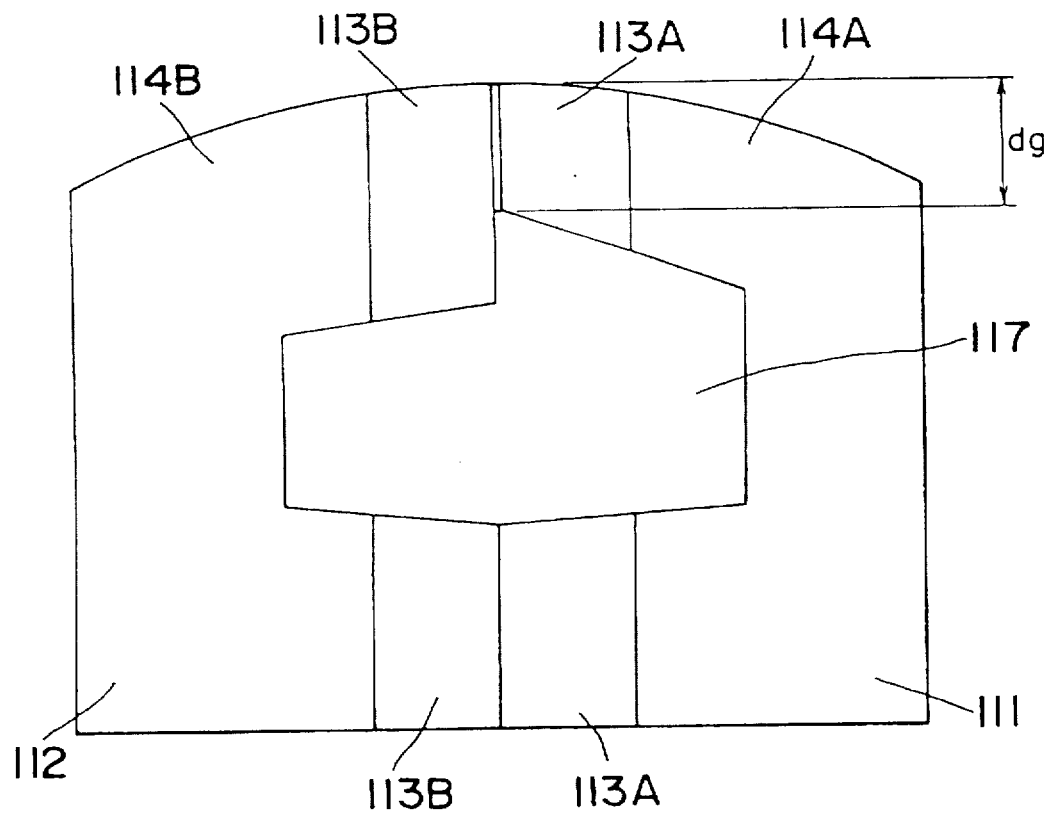
FIG. 17B is a sectional view of a core along a direction 118 of head motion or sliding relative to a medium.

FIGS. 14A, 14B and 15A, 15B show ring-type magnetic heads of laminated type, and FIGS. 14B and 15B show cross sections along lines 88, 98. In the magnetic heads, the first magnetic core half 81, 91 is used at the leading side, while the second one 82, 92 is used at the trailing side. Three metallic soft magnetic films 85A, 85B, 95A, 95B and two nonmagnetic insulating films 86A, 86B, 96A, 96B are layered alternately on a ceramic substrate 87, 97, and a nonmagnetic substrate 83, 93 sandwiches the layered films with the substrate 87, 97 interposing a glass layer 84, 94. A whole core for forming a magnetic circuit of the head comprises metallic soft magnetic materials. A narrow head gap 7 is formed aslant between the leading side and the trailing side with an azimuth angle α. The layered structure including the insulating films 86A, 86B, 96A, 96B is adopted in order to reduce an eddy current loss when used at high frequencies. The metallic soft magnetic films 85A, 95A at the leading side (having saturation magnetic flux density $B_{SA}$) are made of a magnetic material different from that of metallic soft magnetic films 85B, 95B at the trailing side (having saturation magnetic flux density $B_{SB}$), and a relation $B_{SB} > B_{SA}$ is satisfied.

Gap depth $d_g$ is shown in FIGS. 14B and 15B. In general, a ring-type magnetic head is produced so that the width of the plane of the first magnetic core half 81, 91 at the gap along the direction of gap 7 is set to be about equal to that of the second magnetic core half 82, 92. The two planes of the first and second magnetic core halves oppose each other to form the gap 7. In such a case that a cross section of a magnetic circuit at the opposing plane at the first magnetic core half 81, 91 is smaller than that of the second one 82, 92 according to the invention, it is understood that the gap depth $d_g$ is determined by a shape of cross section at the opposing plane of the first magnetic core half 81, 91.

For example, such a structure is realized simply, as shown in FIG. 14B, by forming a winding window 87 only for the first magnetic core half 81. Even if a winding window 97 is formed for the two magnetic core halves 91, 92, as shown in FIG. 15B, a cross section of a magnetic circuit at the opposing plane of the first magnetic core half 91 is set to be smaller than that of the second one 92.

As explained already, only the characteristic that a cross section of a magnetic circuit at the opposing plane at the gap of the first magnetic core half is smaller than that of the second one is not sufficient to obtain asymmetric magnetic field steeper at the trailing side with respect to the gap center line. The ring-type magnetic head of the second example of the invention combines a head structure that saturation magnetic flux density $B_{SB}$ of a magnetic material at and near the gap-forming plane of the second magnetic core half is larger than $B_{SA}$ of the second one with another head structure that a cross section of a magnetic circuit at the gap-forming plane of the first magnetic core half is smaller than that of the second one. Then, recording and reproduction characteristic due to the recording mechanism of the invention is enhanced.

Therefore, a reproduced output is increased, especially in a high linear recording density region, if compared with a head with only the characteristic of $B_{SB}$ larger than $B_{SA}$, and the most suitable recording current can be reduced to decrease consumption power of the recording and reproduction apparatus. For example, the optimum electromotive force (a product of recording current times a number of windings) for obtaining the maximum output at recording wavelength 0.5 μm is about 0.4 $AT_{p-p}$ for a laminated magnetic head only making $B_{SB}$ larger than $B_{SA}$, while it is as small as about. 0.3–0.35 $AT_{p-p}$ for magnetic heads where the head structures shown in FIGS. 14A, 14B and 15A, 15B is realized at the same time.

In the head structures shown in FIGS. 14A, 14B and 15A, 15B, $B_{SA}$ is needed to be 0.8 T or higher in order to obtain an ability to reverse magnetization sufficiently by the recording magnetic field at the leading side. If a difference between $B_{SB}$ and $B_{SA}$ is provided, it is preferable that $B_{SB}$ is 1.2 times or more as large as $B_{SA}$ and it is also preferable that gap length is 0.22 μm or less, as in the case with the head structures explained already, in order to obtain asymmetry of recording magnetic field sufficiently.

Magnetic materials at and near the opposing planes at the gap of the first and second magnetic core halves may be metallic soft magnetic films of cobalt amorphous film, Sendust film, cobalt nitride superstructure alloy film, iron microcrystalline film or the like, as in the other head structures already mentioned.

The head structure wherein a cross section of magnetic circuit at the opposing plane at the gap of the first magnetic core half is smaller than that of the second one is not limited to a ring-type magnetic head of laminated type, but applicable also to a ring-type magnetic head of MIG type as shown in FIGS. 16A, 16B and 17A, 17B. The magnetic heads of MIG type shown in FIGS. 16A, 16B and 17A, 17B have metallic soft magnetic films 103A, 113A and 103B, 103B formed on the ferrite cores 104A, 104B and 114A, 114B at the magnetic core halves 101, 111 and 102, 112 provided at the trailing and leading sides, and the metallic soft magnetic films 103A and 103B define the head gap 7. Similarly to the magnetic head shown in FIG. 6, the metallic soft magnetic films at the leading side (having saturation magnetic flux density $B_{SA}$) are made of a magnetic material different from that of metallic soft magnetic films at the trailing side (having saturation magnetic flux density $B_{SB}$), and a relation $B_{SB} > B_{SA}$ is satisfied. Glass portions 105, 115 are filled in the triangular concave portions at two sides.

In these case, a structure that an average film thickness of the metallic soft magnetic film at the gap-forming plane of the second magnetic core half is larger than that of the first magnetic core half, as in the first head structure, can be provided at the same time. Then, asymmetry of recording magnetic field is enhanced, and the gradient of magnetic field at the trailing edge side becomes still larger, so that recording and reproduction characteristics are improved more favorably.

Third Example of Ring-type Magnetic Head

Next, as a third example, a ring-type magnetic head is explained in detail which comprises first and second magnetic core halves with a metallic soft magnetic film to form a gap of a magnetic circuit between the first and second magnetic half cores. A magnetic material of the metallic soft magnetic film of the first magnetic core half at and near the gap comprises a plurality of elements which are the same as those of a magnetic material of the second magnetic core half at and near the gap, or the magnetic material of the first magnetic core half at and near the gap comprises at least one of elements B, C, N and O besides elements included in the magnetic material of the second magnetic core half at and near the gap. Saturation magnetic flux density of the metallic soft magnetic film formed on the gap-forming plane of the first magnetic core half is smaller than that of the metallic soft magnetic film formed on the gap-forming plane of the second magnetic core half.

In the third example, in order to provide a magnetic head producing asymmetric recording magnetic field with respect to the gap center line and having the gradient of magnetic field larger at the trailing side, the saturation magnetic flux density $B_{SB}$ of the metallic soft magnetic film formed on the opposing plane at the gap of the second magnetic core half is larger than $B_{SA}$ of the metallic soft magnetic film formed on the other opposing plane at the gap of the first magnetic core half. However, if the magnetic material at and near the gap-forming plane of the first magnetic core half comprises a metallic soft magnetic film different from that at and near the gap-forming plane of the second magnetic core half, a disadvantage arises from a viewpoint of productivity. For example, if the metallic soft magnetic films comprise different elements from each other as main components, quite different production apparatuses or conditions may be required. Further, if metallic soft magnetic films of different kinds are made by the same apparatus, one of the films may be contaminated by constituent element of the other and vice versa, and this may cause deterioration of magnetic characteristics.

In order to prevent the decrease in productivity, the third example provides a difference in saturation magnetic flux density by making the metallic soft magnetic films have same kinds of elements at the two sides of the first and second magnetic core halves, but with compositions different from each other.

For example, a nitride or oxide film of iron or cobalt, produced with reaction sputtering, is suitable for the metallic soft magnetic films for the head structure. As a representative, an iron nitride microcrystalline film can have saturation magnetic flux density of about 1 T to 1.6 T by using a simple operation to change a partial pressure of nitrogen on sputtering in a range where good soft magnetic characteristics are obtained. In the range, a film has a higher saturation magnetic flux density at the side of the second magnetic core half and another film has a lower saturation magnetic flux density at the side of the first magnetic core half. In this case, the elements of the main components are the same, but only the composition ratio thereof is different. Therefore, even if the first magnetic core half and the second one are produced by the same apparatus, bad effects on magnetic characteristics due to contamination of impurity atoms or the like is small. This production process is very simple and superior an reproducibility and productivity in contrast to a case where different kinds of films such as a Sendust film and an iron nitride microcrystalline film are selected for the first and second magnetic core halves, respectively.

Further, a structure may also be adopted that a magnetic material of the first magnetic core half at and near the gap comprise at least one of elements B, C, N and O besides elements included in a magnetic material of the second magnetic core half at and near the gape and the magnetic material of the first magnetic core at the opposing plane at the gap of the first magnetic core half has saturation magnetic flux density smaller than the magnetic material of the second magnetic half core at the other opposing plane.

These elements such as B, C, N and O may be easily added to the metallic soft magnetic film at the side of the first magnetic core half with sputtering process or the like, to decrease saturation magnetic flux density lower than that of the second magnetic core half while maintaining good soft magnetic characteristics. Because added amounts of the elements are very small, it is not needed to make the main components of the metallic soft magnetic film at the side of the first magnetic core half different from those at the side of the second one. Therefore, even if the first and second magnetic core halves are produced by the same apparatus, contamination of impurities are relatively small. Further, the production process is simple and superior on reproducibility and productivity. The above-mentioned head structure can be applied widely to various metallic soft magnetic films including iron and cobalt and having soft magnetic characteristics suitable for a magnetic head.

At least one among B, C, N and O may be added to the metallic soft magnetic films at the side of the second magnetic core half. In this case, for example, a composition ratio of the elements in the metallic magnetic films at the side of the first magnetic core half is made larger than that in the metallic magnetic films at the side of the second one, or elements among B, C, N and O which are not included in the second magnetic core half may be added to the metallic soft magnetic films at the side of the first one, so that saturation magnetic flux density of the metallic soft magnetic films at the first magnetic core becomes smaller than that at the second one.

Figure 18:
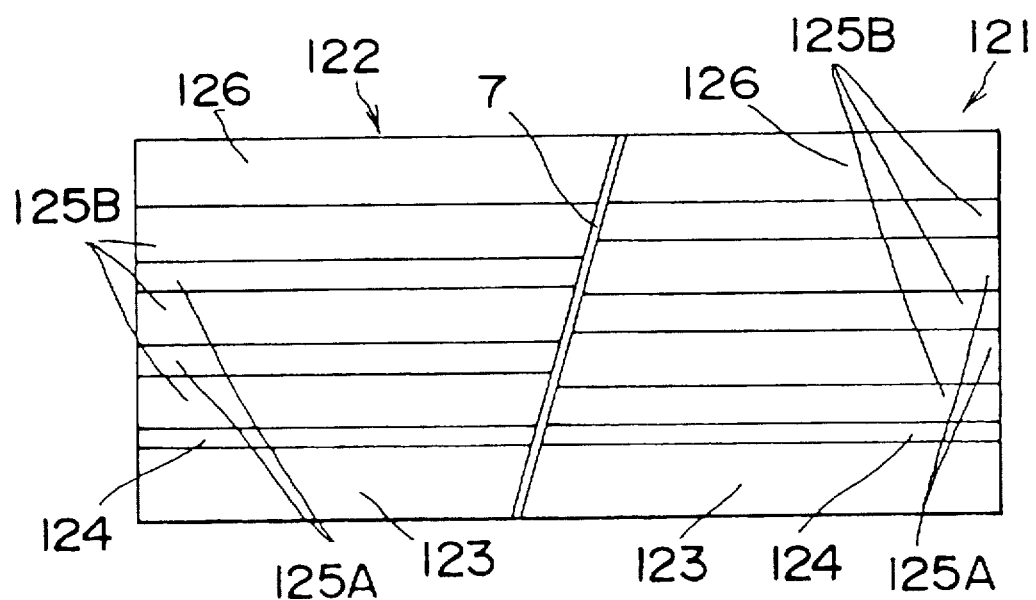
FIG. 18 is a diagram of a medium sliding plane of a magnetic head.
Figure 19:
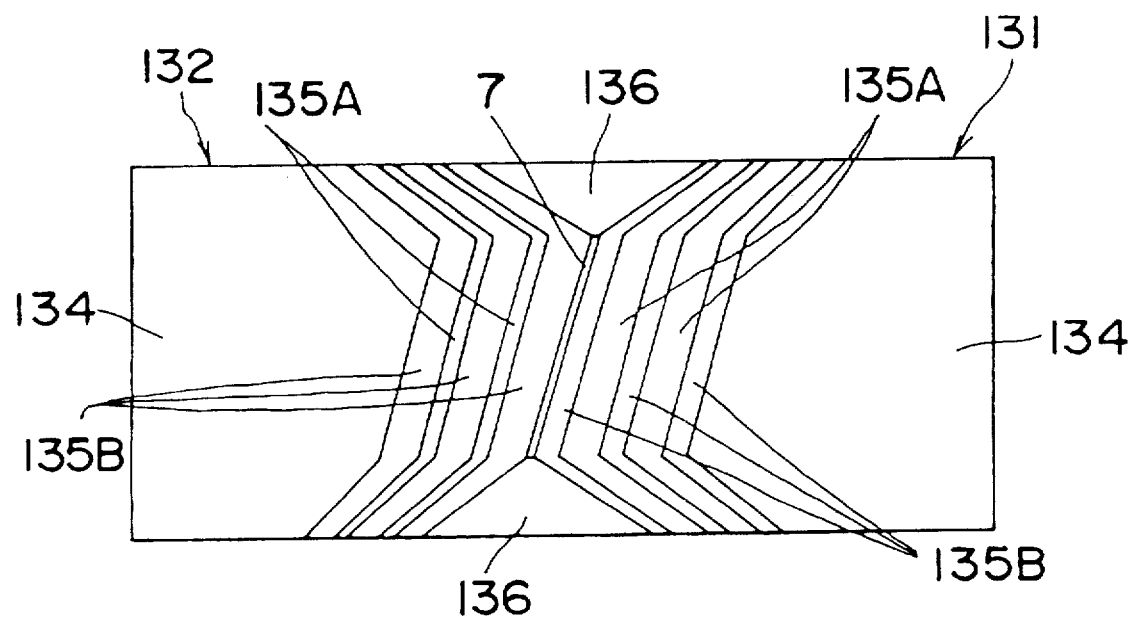
FIG. 19 is a diagram of a medium sliding plane of a magnetic head.

In order to produce the magnetic head of the invention where a magnetic material of the first magnetic core half at and near the gap comprises a plurality of elements which are the same as those of a magnetic material of the second magnetic core half at and near the gap, the metallic soft magnetic films at the first and second magnetic core halves may comprise a multi-layered film made of a plurality of kinds of films having different-saturation magnetic flux densities from each other, so as to differentiate a composition ratio at the two magnetic core halves. FIGS. 18 and 19 show examples of such magnetic heads. In the magnetic heads shown in FIGS. 18 and 19, the first magnetic core half 121, 131 is located at the right side of the gap, while the second one 122, 132 is at the left side.

FIG. 18 shows an example of a magnetic head of laminated type. Five layers of soft magnetic materials are formed at the first and second magnetic core halves 121 and 122. That is, three metallic soft magnetic films 125B of a first kind and two metallic soft magnetic films 125A of a second kind are layered alternately on a nonmagnetic substrate 126. However, the thicknesses of the two kinds of films 125A and 125B are different between the first and second magnetic core halves 121 and 122, or the thickness of the films 125A is larger in the first magnetic core half 121 than in the second one 122, while the thickness of the films 125A is smaller in the first magnetic core half 121 than in the second one 122. Finally, a ceramic substrate 123 sandwiches the layered films with the substrate 126 interposing a glass layer 124. A narrow head gap 7 is formed aslant between the leading side and the trailing side with an azimuth angle α.

FIG. 19 shows another example of a magnetic head of MIG type. Five layers of soft magnetic materials are formed on ferrite portions 134 at the first and second magnetic core halves 131 and 132. That is, three metallic soft magnetic films 135B of a first kind and two metallic soft magnetic films 135A of a second kind are layered alternately on the ferrite portion 134. However, the thicknesses of the two kinds of films 135A and 135B are different between the first and second magnetic core halves 131 and 132, or the thickness of the films 135A is larger in the first magnetic core half 131 than in the second one 132, while the thickness of the films 135A is smaller in the first magnetic core half 131 than in the second one 132, similarly to the head shown in FIG. 18. A narrow head gap 7 is formed aslant between the leading side and the trailing side with an azimuth angle α. Finally, glass portions 136 are filled in the triangular concave portions at two sides.

Saturation magnetic flux density $B_{SB}$ of the films 125B, 135B is larger than $B_{SA}$ of the films 125A, 135A. In this case, a ratio of a total film thickness of the soft magnetic films of the second kind 125B, 135B at the side of the second magnetic core halves 122, 132 is set to be larger than that of the soft magnetic films of the first kind 125A, 135A at the side of the first magnetic core halves 121, 131, so that, on the average, saturation magnetic flux density of the metallic soft magnetic films at the side of the second magnetic core half 132 is larger than that of the metallic soft magnetic films at the side of the first magnetic core halves 121, 131.

For the metallic soft magnetic films shown in FIGS. 18 and 19, a nitride or oxide film of iron or cobalt produced with reaction sputtering is suitable. In such a film, layered films of the metallic soft magnetic films 125A, 135A and 125B, 135B are produced easily by changing a partial pressure of nitrogen or oxygen at a constant period when they are formed.

The metallic soft magnetic films 125A, 135A and 125B, 135B may comprise quite different compositions from each other. However, from a viewpoint of productivity, it is preferable to have same elements as main components, as described above. Especially, if the metallic soft magnetic films 125A, 135A and 125B, 135B comprise quite different compositions from each other, a contact potential difference effect may arise due to a difference in work function between the films so that corrosion resistance is not sufficient. In such a case, the interface between the films may become uncertain or composition ratio between the films may be homogenized, by using annealing after forming the films.

Though FIGS. 18 and 19 show magnetic heads wherein the metallic soft magnetic films has a layered structure of two kinds of films, the films may have a layered structure of three or more kinds of films. In this type of head, film thicknesses and sequential order of layered films are changed at the leading and trailing sides. The number of the layered films is also not limited to five shown in FIGS. 18 and 19. For example, advantages of the invention can be obtained for a magnetic head wherein the number of the layered films may be different at the two sides of the first and second core halves.

Further, the magnetic head structure, where a magnetic material of the first magnetic core half at and near the gap comprises a plurality of elements which are the same as those of a magnetic material of the second magnetic core half at and near the gap, can also be realized by a structure wherein the first and second magnetic cores at and near the gap comprises a layered structure of metallic soft magnetic films and nonmagnetic insulating films, and a ratio of a total film thickness of the metallic soft magnetic films to a total film thickness of the nonmagnetic insulating films of the magnetic material of the first magnetic core at and near the opposing plane at the gap is different from that of the second magnetic core at and near the other opposing plane at the gap, to provide a difference of saturation magnetic flux density of the metallic soft magnetic films at the two magnetic cores.

Figure 20:
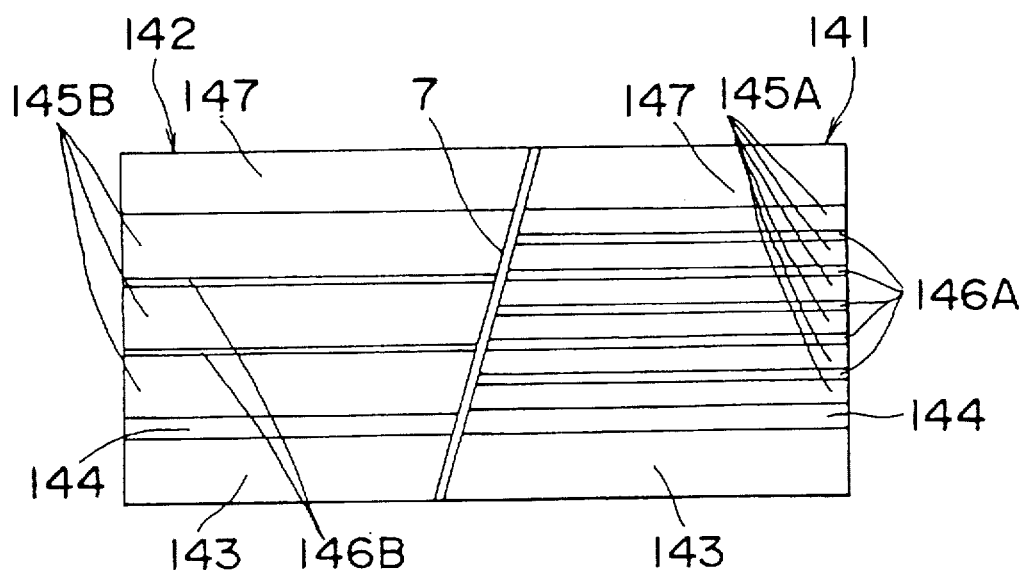
FIG. 20 is a diagram of a medium sliding plane of a magnetic head.
Figure 21:
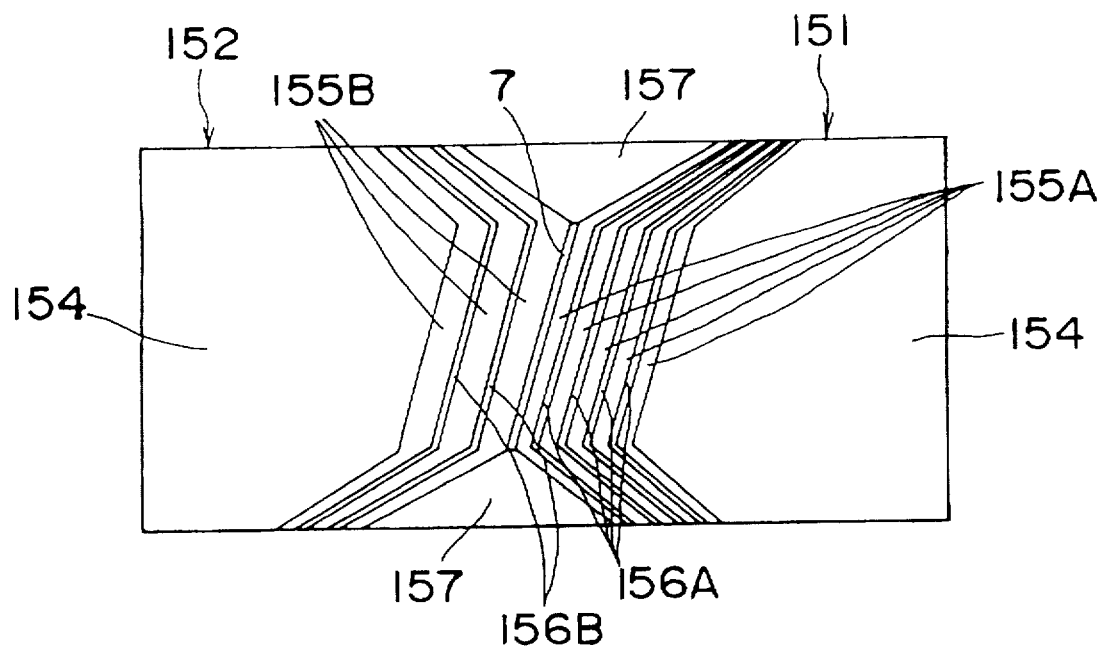
FIG. 21 is a diagram of a medium sliding plane of a magnetic head.

FIGS. 20 and 21 show examples of such structures, wherein the first magnetic core half 141, 151 is located at the right side of the gap 7, while the second one 142, 152 is located at the left sides similarly to the magnetic heads shown in FIGS. 11A–17B. FIG. 20 shows an example of magnetic head of laminated type, while FIG. 21 shows an example of magnetic head of MIG type.

FIG. 20, six metallic soft magnetic films 145A and five nonmagnetic insulating films 146A are layered alternately on a ceramic substrate 147 at the first magnetic core half 141, while three metallic soft magnetic films 145B and two soft magnetic films 146B are layered alternately at the second magnetic core half 142 on A ceramic substrate 147. Finally, a nonmagnetic substrate 143 sandwiches the layered films with the substrate 147, interposing a glass layer 144. A narrow head gap 7 is formed aslant between the leading side and the trailing side.

In FIG. 21, five metallic soft magnetic films 155A and four nonmagnetic insulating films 156A are layered alternately on the ferrite portion 154 at the first magnetic core half 151, while three metallic soft magnetic films 155B and two nonmagnetic insulating films 156B are layered alternately on the ferrite portion 154 at the second magnetic core half 152. A narrow head gap 7 is formed aslant between the leading side and the trailing side. Finally, glass portions 157 are filled in triangular concave portions at two sides.

In FIGS. 20 and 21, a ratio of a total film thickness of the metallic soft magnetic films to a total film thickness of the nonmagnetic insulating films of the magnetic material of the second magnetic core at and near the planes at the gap is larger than that of the first magnetic core at and near the other opposing plane at the gap, so that, on the average, the saturation magnetic flux density at and near the second magnetic core can be made larger than that at and near the first one.

In the above-mentioned head structure, a simple production process of, for example, changing a gas partial pressure in the sputter at a constant period cannot be used. However, in the preparation of the nonmagnetic insulating films 146A, 146B. 156A, 156B, it is not needed to control preparation conditions and impurity concentrations precisely in contrast to the preparation of the metallic soft magnetic films. Therefore, if two kinds of targets for the metallic soft magnetic films and for the nonmagnetic insulating films are prepared in a vacuum chamber and they are sputtered alternately, productivity and reproducibility are relatively good. Especially, the process is much simpler and superior on reproducibility and productivity than the process for the head structures where the metallic soft magnetic films having quite different compositions from each other are prepared.

Further, the existence of the nonmagnetic insulating films is effective to reduce eddy current loss at the metallic soft magnetic films. For example, in the first structure of magnetic head mentioned already, it is needed to make an average film thickness of the metallic soft magnetic film 53A, 63B, 73B at the side of the second magnetic core half two or more times as large as that of the metallic soft magnetic film at the side of the first magnetic core half, while if the average film thickness becomes too large, high frequency loss due to eddy current loss is generated. However, if the structure shown in FIG. 21 is realized in the structure shown in FIGS. 11A and 11B, high frequency loss due to eddy current loss can be reduced even if the average film thickness of the metallic soft magnetic films becomes rather large, and there is a room to make the film thickness larger, resulting in a more asymmetric recording magnetic field. Further, in this case, it is clear that if saturation magnetic flux density at and near the plane at the gap at the side of the second magnetic core is larger than that at the side of the first magnetic core, an effect to enhance asymmetry of recording magnetic field can also be obtained preferably.

On the other hand, as the thickness ratio of the nonmagnetic films is increased, saturation magnetic flux density, on the average, at and near the gap-forming plane decreases. Especially, it is to be noted that saturation magnetic flux density, on the average, at and near the opposing plane at the gap at the side of the first magnetic core does not become smaller than 0.8 T. Further, in the magnetic head of laminated type shown in FIG. 20, if the film thickness of the nonmagnetic insulating films is large, signals are liable not to be recorded at positions where the nonmagnetic insulating films exist along a direction of track width. In order to prevent this phenomenon, the film thickness of the nonmagnetic insulating films is needed to be sufficiently small as far as there is a difference in saturation magnetic flux density. On the average, between two sides of the first and second magnetic cores. Preferably, it is about a few hundred nanometers or less. It may also be adopted to make an interface between the metallic soft magnetic film and the nonmagnetic insulating film uncertain or to make the composition homogenize. However, in this case, an effect to reduce eddy current loss is liable to be lost, and it is important to determine the most suitable head structure by taking into account frequency range of a magnetic recording and reproduction apparatus with the magnetic head.

According to the above-mentioned examples, ring-type magnetic heads of the invention can be produced by processes superior on reproducibility and productivity. That is, the magnetic heads of the invention can be provided at about the same or even lower cost, without sacrificing productivity.

The ring-type magnetic heads as shown in FIGS. 11A–21 can be mounted with the first magnetic core half at the leading side to construct the magnetic recording and reproduction apparatus, and a basic structure is similar to that shown in FIG. 2. In such magnetic recording and reproduction apparatus, recording and reproduction characteristics are measured, and results similar to those shown in FIGS. 7–10 are obtained, and advantages of the invention are confirmed sufficiently.

The invention improves characteristics on recording process due to decrease in magnetization transition width. Therefore, in order to obtain advantages of the invention, it is needed to put the first magnetic core half (or a magnetic core having a lower saturation magnetic flux density) at the leading side, at least in the recording process. However, if the magnetic head of the invention is used also as a reproduction head, if necessary, the second magnetic core half (or a magnetic core having a higher saturation magnetic flux density) may be put at the leading side only in the reproduction process. Further, as explained already, if the magnetic head of the invention is used as a recording head, the advantages of the invention is obtained irrespective of a reproduction head.

In the above-mentioned embodiments, evaporation tapes having cobalt and oxygen as main components are used as magnetic recording media. However, the invention is not limited to a composition of the magnetic layer. As far as obliquely oriented media having a high degree of crystalline orientation is realized, any magnetic recording media made of various compositions can be used.

Further, materials used for a head are not limited to those used in the above-mentioned embodiments, and various materials may be used as far as the ring-type magnetic head of the invention is constructed, Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording and reproduction apparatus comprising a magnetic recording medium and a ring-type magnetic head for recording signals to said magnetic recording medium, the magnetic recording medium comprising a magnetic layer having an axis of easy magnetization oblique with respect to a film normal of the magnetic layer, said ring-type magnetic head comprising a leading side and a trailing side, in relation to a direction of relative movement of the magnetic recording medium to the ring-type magnetic head, and said ring-type magnetic head comprising a first magnetic core half coated with a first metallic soft magnetic film on a plane of a ferromagnetic ferrite portion, and a second magnetic core half coated with a second metallic soft magnetic film on a plane of a ferromagnetic ferrite portion, to form a gap of a magnetic circuit between the first and second magnetic core halves, the first magnetic core half being provided at the leading side of the ring-type magnetic head and the second magnetic core half being provided at the trailing side of the ring-type magnetic head with respect to the direction of relative movement of said magnetic recording medium to said ring-type magnetic head when signals are recorded to said magnetic recording medium such that said first metallic soft magnetic film is provided closer to said leading side than is said second metallic soft magnetic film, wherein an average film thickness of said first metallic soft magnetic film at said gap is at least 1.5 $\mu$m and an average film thickness of said second metallic soft magnetic film at said gap is at least twice that of said first metallic soft magnetic film, and a direction of recording magnetic field near the gap at the leading side and the axis of easy magnetization of said magnetic recording medium are oblique in the magnetic layer at the same side with respect to the film normal of the magnetic layer of said magnetic recording medium in a normal plane relative to the direction of relative movement of said magnetic recording medium to said ring-type magnetic head.

2. The apparatus according to claim 1, further comprising a holder which holds said magnetic recording medium therein, wherein said holder removably insertable into the apparatus to locate said magnetic recording medium near said magnetic head.

3. The apparatus according to claim 2, wherein said holder comprises a cassette which is detachable from the apparatus.

4. The apparatus according to claim 1, wherein said magnetic recording medium comprises a magnetic recording tape and said magnetic head scans said magnetic recording tape along a direction inclined with respect to a longitudinal direction of said magnetic recording tape.

5. The apparatus according to claim 1, wherein said magnetic head has an azimuth angle.

6. The apparatus according to claim 1, wherein said magnetic recording medium comprises a hard disk, and wherein the axis of easy magnetization of said magnetic layer is oblique with respect to the film normal of said magnetic layer and is oriented along a circumferential direction of said disk.

7. The apparatus according to claim 1, wherein the saturation magnetic flux density of the first metallic soft magnetic film at the gap is at least 0.8 T and the saturation magnetic flux density of second the metallic soft magnetic film at the gap is at least 1.2 times that of the first metallic magnetic soft film at and near the gap.

8. The apparatus according to claim 7, wherein a gap length of said ring-type magnetic head is not greater than 0.22 $\mu$m.

9. The apparatus according to claim 7, wherein said axis of easy magnetization of the magnetic layer with respect to the film normal of the magnetic layer is at an angle of from at least 50° to not greater than 85°, and wherein a coercive force along the axis of easy magnetization is at least 80 KA/m, and a uniaxial anisotropy constant of said magnetic layer is at least $10^5$ J/m$^3$ or more.

10. The apparatus according to claim 1 wherein said gap of said magnetic circuit comprises a center line, and said recording magnetic field is asymmetric with respect to said center line.

11. The apparatus according to claim 10, wherein said recording magnetic field comprises a gradient in said magnetic layer at said leading side of said ring-type magnetic head and a gradient in said magnetic layer at said trailing side of said ring-type magnetic head and said gradient at said trailing side is steeper than said gradient at said leading side.

12. The magnetic recording and reproduction apparatus of claim 1, wherein said angle of easy magnetization of said magnetic layer, and said direction of said recording magnetic field near said leading side are inclined obliquely with respect to said film normal in the same general direction with respect to each other.

* * * * *

UNITED STATES PATENT AND TRADEMARK OFFICE
CERTIFICATE OF CORRECTION

PATENT NO. : 5,912,783
DATED : June 15, 1999
INVENTOR(S) : T. ISHIDA et al.

It is certified that error appears in the above-identified patent and that said Letters Patent is hereby corrected as shown below:

On the cover of the printed patent, at item [57], Abstract, line 5, after "medium" insert --- . ---.

At column 24, line 34 (claim 2, line 3) of the printed patent, after "holder" insert ---is---.

At column 24, line 55 (claim 7, line 4) of the printed patent, insert ---the--- after "density of" and delete "the" before "metallic".

Signed and Sealed this

Twentieth Day of June, 2000

Attest:

Q. TODD DICKINSON

*Attesting Officer*        *Director of Patents and Trademarks*